United States Patent
Zhu et al.

(10) Patent No.: US 12,363,702 B2
(45) Date of Patent: Jul. 15, 2025

(54) COMMUNICATION METHOD, APPARATUS, AND SYSTEM

(71) Applicant: HUAWEI TECHNOLOGIES CO., LTD., Shenzhen (CN)

(72) Inventors: Fangyuan Zhu, Beijing (CN); Yan Li, Beijing (CN); Jianning Liu, Shenzehen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 372 days.

(21) Appl. No.: 17/809,790

(22) Filed: Jun. 29, 2022

(65) Prior Publication Data

US 2022/0330294 A1    Oct. 13, 2022

Related U.S. Application Data

(63) Continuation of application No. PCT/CN2019/130186, filed on Dec. 30, 2019.

(51) Int. Cl.
H04W 76/10    (2018.01)
H04W 72/1268   (2023.01)
H04W 92/10    (2009.01)

(52) U.S. Cl.
CPC ....... H04W 72/1268 (2013.01); H04W 76/10 (2018.02); *H04W 92/10* (2013.01)

(58) Field of Classification Search
CPC ....... H04W 4/48; H04W 8/005; H04W 72/04; H04W 72/23; H04W 72/1268; H04W 76/10; H04W 76/14

(Continued)

(56) References Cited

U.S. PATENT DOCUMENTS

2016/0373915 A1* 12/2016 Kim ............... H04W 76/14
2019/0037539 A1*  1/2019 Jung .............. H04W 72/04

FOREIGN PATENT DOCUMENTS

CN    1722733 A    1/2006
CN  104796994 A    7/2015

(Continued)

OTHER PUBLICATIONS

Extended European Search Report issued in corresponding European Application No. 19958438.4, dated Nov. 23, 2022, pp. 1-7.

(Continued)

*Primary Examiner* — Harun Chowdhury
(74) *Attorney, Agent, or Firm* — HAUPTMAN HAM, LLP

(57) ABSTRACT

A method includes a communication apparatus receives first parameter information of an air interface scheduling resource allocated by an access network device accessed by a terminal device, where the first parameter information includes a length of a first periodicity and a first start moment. The communication apparatus determines, based on the first parameter information, second parameter information of a scheduling resource for processing first uplink data, where the second parameter information includes a length of a second periodicity and a second start moment. Based on the foregoing solution, the communication apparatus receives the first parameter information of the air interface scheduling resource, and adjusts, based on the first parameter information, a periodicity and/or a start moment for locally processing the uplink data, so that an end-to-end latency is reduced, thereby improving user experience.

15 Claims, 8 Drawing Sheets

(58) Field of Classification Search
USPC .......................................... 370/252, 280, 329
See application file for complete search history.

(56) References Cited

FOREIGN PATENT DOCUMENTS

| | | |
|---|---|---|
| CN | 110381474 A | 10/2019 |
| WO | 2011128141 A1 | 10/2011 |
| WO | 2014043665 A2 | 3/2014 |

OTHER PUBLICATIONS

3GPP TR 22.827 V1.1.0 (May 2019), 3rd Generation Partnership Project; Technical Specification Group Services and System Aspects; Study on Audio-Visual Service Production Stage 1(Release 17), 77 pages.

International Search Report issued in corresponding International Application No. PCT/CN2019/130186, dated Sep. 21, 2020, pp. 1-9.

\* cited by examiner

T1: Device processing time
T2: Time for waiting for air interface scheduling
T3: Air interface scheduling transmission time
T3': Transmission time from an access network device to a DN
T4: Time for waiting for processing

COMMUNICATION METHOD, APPARATUS, AND SYSTEM

CROSS-REFERENCE TO RELATED APPLICATIONS

This application is a continuation of International Application No. PCT/CN2019/130186, filed on Dec. 30, 2019, the disclosure of which is hereby incorporated in entirety by reference.

BACKGROUND

In some application scenarios, when performing a service, a terminal device needs to send data to a network side, and the network side processes the data reported by the terminal device.

An example in which the terminal device is a media device is used for description. The media device includes an audio (Audio) processor and a radio (Radio) processor. The audio processor and the radio processor of the media device are encapsulated separately. When the media device sends media frame data, the following processes are performed:

(1) The audio processor processes the media frame data and then sends the media frame data to the radio processor.

(2) The radio processor waits for an air interface scheduling resource allocated by an access network device, and sends the media frame data on the air interface scheduling resource after receiving the air interface scheduling resource.

(3) After an application server receives the media frame data, an audio processor of the application server samples and processes the media frame data after a next data sampling periodicity of the application server arrives.

How to optimize a latency in the foregoing deterministic media transmission is a problem to be resolved.

SUMMARY

This application provides a communication method, apparatus, and system, to optimize a latency in deterministic media transmission.

According to a first aspect, this application provides a communication method, including: A communication apparatus receives first parameter information of an air interface scheduling resource allocated by an access network device accessed by a terminal device, where the first parameter information includes a length of a first periodicity and a first start moment, and the first periodicity and the first start moment are respectively a periodicity and a start moment corresponding to transmitting first uplink data from the terminal device by the access network device on an air interface side. The communication apparatus determines, based on the first parameter information, second parameter information of a scheduling resource for processing the first uplink data, where the second parameter information includes a length of a second periodicity and a second start moment, and the second periodicity and the second start moment are respectively a periodicity and a start moment corresponding to processing the first uplink data by the communication apparatus.

Based on the foregoing solution, the communication apparatus receives the first parameter information of the air interface scheduling resource, and adjusts, based on the first parameter information, a periodicity and/or a start moment for locally processing the uplink data, so that an end-to-end latency is reduced, and a latency variation of a deterministic service is reduced, thereby improving user experience.

In a possible implementation, that the communication apparatus determines, based on the first parameter information, second parameter information of a scheduling resource for processing the first uplink data includes: The communication apparatus adjusts a length of a third periodicity based on the length of the first periodicity, to obtain the length of the second periodicity, where the third periodicity is a periodicity corresponding to processing second uplink data by the communication apparatus before the adjustment; and/or the communication apparatus adjusts a third start moment based on the first start moment, to obtain the second start moment, where the third start moment is a start moment corresponding to processing the second uplink data by the communication apparatus before the adjustment.

In a possible implementation, the communication apparatus is a terminal device. The processing the uplink data includes: transmitting the first uplink data inside the terminal device. After transmitting the first uplink data inside the terminal device based on the length of the second periodicity and/or the second start moment, the terminal device further waits for first duration, and sends the first uplink data on the air interface scheduling resource. The first duration is less than or equal to second duration, and the second duration is duration for which the terminal device waits before sending the second uplink data on the air interface scheduling resource and after transmitting the second uplink data inside the terminal device based on the length of the third periodicity and/or the third start moment.

In a possible implementation, the communication apparatus is the terminal device. The terminal device further sends first indication information to a mobility management network element, where the first indication information is used to request the first parameter information of the air interface scheduling resource currently allocated by the access network device accessed by the terminal device. That a communication apparatus receives first parameter information of an air interface scheduling resource allocated by an access network device currently accessed by a terminal device includes: The terminal device receives the first parameter information from the mobility management network element.

In a possible implementation, that the terminal device sends first indication information to a mobility management network element includes: The terminal device sends a first request to the mobility management network element, where the first request includes the first indication information, and a request message is a registration request, a session establishment request, or a session modification request.

In a possible implementation, the communication apparatus is an application server. After the first uplink data arrives at the application server, the application server waits for third duration based on the length of the second periodicity and/or the second start moment, and processes the first uplink data. The third duration is less than or equal to fourth duration, and the fourth duration is duration for which the application server waits before processing the second uplink data based on the length of the third periodicity and/or the third start moment after the second uplink data arrives at the application server.

In a possible implementation, the communication apparatus is the application server. The application server sends a second request to an application function network element, where the second request includes identification information of the terminal device, and the second request is used to request the first parameter information of the air interface scheduling resource currently allocated by the access network device accessed by the terminal device. That the communication apparatus receives first parameter information of an air interface scheduling resource allocated by an access network device accessed by a terminal device includes: The application server receives the first parameter information from the application function network element.

In a possible implementation, that the second request is used to request the first parameter information of the air interface scheduling resource currently allocated by the access network device accessed by the terminal device includes: A second request message includes second indication information, and the second indication information is used to request the first parameter information of the air interface scheduling resource currently allocated by the access network device accessed by the terminal device.

According to a second aspect, this application provides a communication apparatus. The apparatus is a terminal device, an application server, or is a chip used in the terminal device or the application server. The apparatus has functions of implementing the first aspect or each embodiment of the first aspect. The functions are implemented by hardware, or is implemented by hardware executing corresponding software. The hardware or software includes one or more modules corresponding to the functions.

According to a third aspect, this application provides a communication apparatus, including a processor and a memory. The memory is configured to store computer-executable instructions. When the apparatus runs, the processor executes the computer-executable instructions stored in the memory, to enable the apparatus to perform the method in the first aspect or each embodiment of the first aspects.

According to a fourth aspect, this application provides a communication apparatus, including units or means (means) configured to perform steps in the first aspect or each embodiment of the first aspect.

According to a fifth aspect, this application provides a communication apparatus, including a processor and an interface circuit. The processor is configured to communicate with another apparatus through the interface circuit, and perform the method in the first aspect or each embodiment of the first aspect. There are one or more processors.

According to a sixth aspect, this application provides a communication apparatus, including a processor, configured to: connect to a memory, and invoke a program stored in the memory, to perform the method in the first aspect or each embodiment of the first aspect. The memory is located inside the apparatus, or is located outside the apparatus. In addition, there are one or more processors.

According to a seventh aspect, this application further provides a computer-readable storage medium. The computer-readable storage medium stores instructions, and when the instructions are run on a computer, a processor is enabled to perform the method in the first aspect or each embodiment of the first aspect.

According to an eighth aspect, this application further provides a computer program product including instructions. When the computer program product runs on a computer, the computer is enabled to perform the method in the first aspect or each embodiment of the first aspect.

According to a ninth aspect, this application further provides a chip system, including a processor, configured to perform the method in the first aspect or each embodiment of the first aspect.

According to a tenth aspect, this application further provides a communication system, including an access network device and a core network element. The access network device is configured to send, to the core network element, first parameter information of an air interface scheduling resource allocated by the access network device accessed by a terminal device, where the first parameter information includes a length of a first periodicity and a first start moment, and the first periodicity and the first start moment are respectively a periodicity and a start moment corresponding to transmitting first uplink data from the terminal device by the access network device on an air interface side. The core network element is configured to send the first parameter information to a communication apparatus, where the first parameter information is used by the communication apparatus to determine, based on the first parameter information, second parameter information of a scheduling resource for processing the first uplink data, the second parameter information includes a length of a second periodicity and a second start moment, and the second periodicity and the second start moment are respectively a periodicity and a start moment corresponding to processing the first uplink data by the communication apparatus.

In a possible implementation, the communication apparatus is a terminal device. The processing the uplink data includes: transmitting the first uplink data inside the terminal device. The length of the second periodicity and/or the second start moment are/is used by the terminal device to: after transmitting the first uplink data inside the terminal device based on the length of the second periodicity and/or the second start moment, wait for first duration, and send the first uplink data on the air interface scheduling resource. The first duration is less than or equal to second duration, and the second duration is duration for which the terminal device waits before sending second uplink data on the air interface scheduling resource and after transmitting the second uplink data inside the terminal device based on a length of a third periodicity and/or a third start moment. The third periodicity is a periodicity corresponding to processing the second uplink data by the terminal device before adjustment, and the third start moment is a start moment corresponding to processing the second uplink data by the terminal device before the adjustment.

In a possible implementation, the communication apparatus is the terminal device, and the core network element is a mobility management network element, configured to: receive first indication information from the terminal device, where the first indication information is used to request the first parameter information of the air interface scheduling resource currently allocated by the access network device accessed by the terminal device; send the first indication information to a session management network element; and receive the first parameter information from the session management network element.

In a possible implementation, that the mobility management network element is configured to receive first indication information from the terminal device includes: receiving a first request from the terminal device, where the first request includes the first indication information, and a request message is a registration request, a session establishment request, or a session modification request.

In a possible implementation, the communication apparatus is an application server. The length of the second periodicity and/or the second start moment are/is used by the application server to: after the first uplink data arrives at the application server, wait for third duration based on the length of the second periodicity and/or the second start moment, and process the first uplink data. The third duration is less than or equal to fourth duration, the fourth duration is duration for which the application server waits before processing second uplink data based on a length of a third periodicity and/or a third start moment after the second uplink data arrives at the application server, the third periodicity is a periodicity corresponding to processing the second uplink data by the application server before adjustment, and the third start moment is a start moment corresponding to processing the second uplink data by the application server before the adjustment.

In a possible implementation, the core network element is an application function network element, configured to receive a second request from the application server, where the second request includes identification information of the terminal device, and the second request is used to request the first parameter information of the air interface scheduling resource currently allocated by the access network device accessed by the terminal device.

In a possible implementation, that the second request is used to request the first parameter information of the air interface scheduling resource currently allocated by the access network device accessed by the terminal device includes: A second request message includes second indication information, and the second indication information is used to request the first parameter information of the air interface scheduling resource currently allocated by the access network device accessed by the terminal device.

DESCRIPTION OF EMBODIMENTS

To make objectives, technical solutions, and advantages of this application clearer, the following further describes this application in detail with reference to the accompanying drawings. An operation method in a method embodiment further is applied to an apparatus embodiment or a system embodiment. In descriptions of this application, unless otherwise noted, "a plurality of" means two or more than two.

Figure 1A:
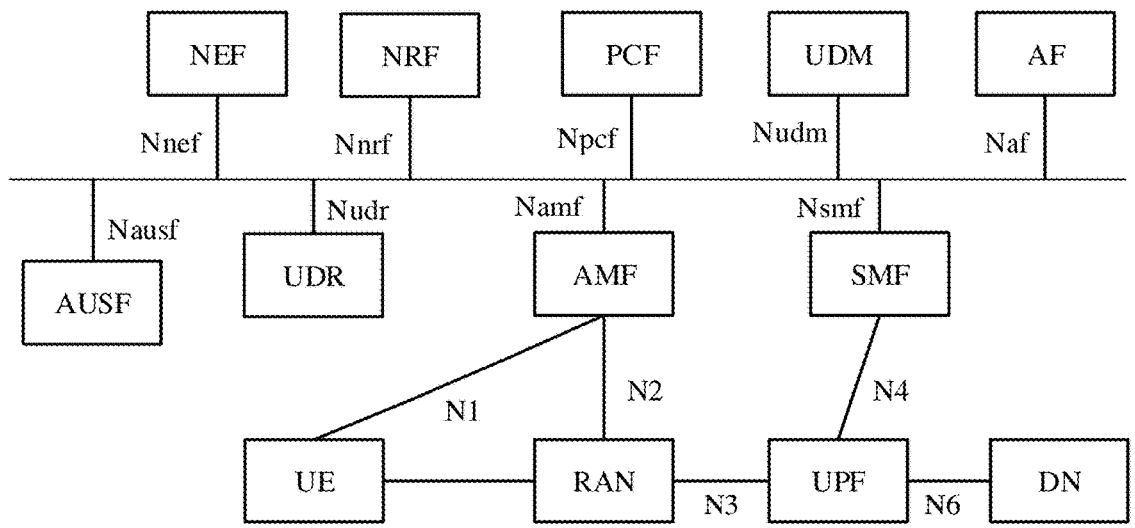
FIG. 1A is a schematic diagram of a 5G network architecture based on a service-oriented architecture.

FIG. 1A is a schematic diagram of a 5th generation (5th generation, 5G) network architecture based on a service-oriented architecture. The 5G network architecture shown in FIG. 1A includes three parts: a terminal device, a data network (data network, DN), and a carrier network. The following briefly describes functions of some network elements.

The carrier network includes one or more of the following network elements: an authentication server function (Authentication Server Function, AUSF) network element, a network exposure function (network exposure function, NEF) network element, a policy control function (policy control function, PCF) network element, a unified data management (unified data management, UDM) network element, a unified data repository (Unified Data Repository, UDR), a network repository function (Network Repository Function, NRF) network element, an application function (application function, AF) network element, an access and mobility management function (access and mobility management function, AMF) network element, a session management function (session management function, SMF) network element, a radio access network (radio-access network, RAN), a user plane function (user plane function, UPF) network element, and the like. In the foregoing carrier network, parts other than the radio access network is referred to as core network parts.

The terminal device (terminal device), which further is referred to as user equipment (user equipment, UE), is a device having a wireless transceiver function. The terminal device is deployed on land, where the deployment includes indoor or outdoor, or handheld or vehicle-mounted deployment; is deployed on water (for example, on a ship); or is deployed in air (for example, on an airplane, a balloon, or a satellite). The terminal device is a mobile phone (mobile phone), a tablet computer (pad), a computer having a wireless transceiver function, a virtual reality (virtual reality, VR) terminal device, an augmented reality (augmented reality, AR) terminal device, a media device (for example, an electronic device on which a terminal device is installed, such as an electronic guitar or an electronic drum), a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like.

The terminal device establishes a connection with the carrier network through an interface (for example, N1) provided by the carrier network, and use services such as a data service and/or a voice service provided by the carrier network. The terminal device further accesses the DN through the carrier network, and use a carrier service deployed on the DN and/or a service provided by a third party. The third party is a service provider other than the carrier network and the terminal device, and provides services such as a data service and/or a voice service for the terminal device. A representation form of the third party is determined based on an actual application scenario, and is not limited herein.

The RAN is a sub-network of the carrier network, and is an implementation system between a service node in the carrier network and the terminal device. To access the carrier network, the terminal device first passes through the RAN, and is connected to the service node in the carrier network through the RAN. A RAN device in this application is a device that provides a wireless communication function for the terminal device, and the RAN device is further referred to as an access network device. The RAN device in this application includes but is not limited to: a next generation NodeB (gNodeB, gNB) in 5G, an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), a transmission reception point (transmission reception point, TRP), a transmission point (transmission point, TP), a mobile switching center, and the like.

The AMF network element is responsible for mobility management of a user, including mobility status management, temporary user identity allocation, and user authentication and authorization.

The SMF network element has functions such as session management, execution of a control policy delivered by the PCF, UPF selection, UE internet protocol (internet protocol, IP) address allocation, bearer establishment, modification and release, and quality of service (Quality of Service, QoS) control.

The UPF network element supports functions such as interconnection between a PDU session and a data network, packet routing and forwarding, and data packet detection.

The UDM network element is mainly responsible for functions such as subscription data management and user access authorization.

The UDR stores and retrieves subscription data, policy data, and common architecture data for the UDM, the PCF, and the NEF to obtain related data. The UDR needs to provide different data access authentication mechanisms for different types of data, such as the subscription data and the policy data, to ensure data access security. For an invalid service-oriented operation or data access request, the UDR needs to be able to return a failure response carrying an appropriate cause value.

The NEF mainly supports a network capability exposure function and exposes a network capability and a service. A 3rd generation partnership project (3rd generation partnership project, 3GPP) NF exposes a function and an event to other NFs through the NEF. The capability and the event exposed by the NF is securely exposed to a third-party application. The NEF uses a standardized interface (Nudr) of the unified data repository (UDR) to store/retrieve structured data, and translates exchange information of the AF and exchange information of an internal network function.

The AF network element is configured to provide an application layer service for the UE. When providing the service for the UE, the AF has a condition on a QoS policy and a charging policy, and needs to notify a network. In addition, the AF further is configured to use application-related information fed back by the core network.

The PCF network element is mainly responsible for policy control functions such as session-level or service flow-level charging, QoS bandwidth guarantee and mobility management, and UE policy decision. In this architecture, PCFs connected to the AMF and the SMF are separately an AM PCF (PCF for Access and Mobility Control) and an SM PCF (PCF for Session Management). In an actual deployment scenario, the PCFs is unable to be a same PCF entity.

The NRF network element is configured to provide a network element discovery function and provide, based on a request from another network element, network element information corresponding to a network element type. The NRF further provides a network element management service, for example, registration, update, and deregistration of a network element and subscription and push of a network element status.

The AUSF network element is mainly responsible for user authentication, to determine whether to allow a user or a device to access a network.

The DN is a network outside the carrier network. The carrier network accesses a plurality of DNs. A plurality of services are deployed on the DN, and the DN provides services such as a data service and/or a voice service for the terminal device. For example, the DN is a private network of a smart factory, a sensor installed in a workshop of the smart factory is a terminal device, a control server of the sensor is deployed in the DN, and the control server provides a service for the sensor. The sensor communicates with the control server, to obtain instructions of the control server, transmit collected sensor data to the control server based on the instructions, and the like. For another example, the DN is an internal office network of a company, a mobile phone or a computer of an employee of the company is a terminal device, and the mobile phone or the computer of the employee accesses information, data resources, and the like on the internal office network of the company.

In FIG. 1A, Nausf, Nnef, Npcf, Nudm, Naf, Namf, Nsmf, N1, N2, N3, N4, and N6 are interface serial numbers. For meanings of these interface serial numbers, refer to 3GPP standard protocol. This is not limited herein.

Figure 1B:
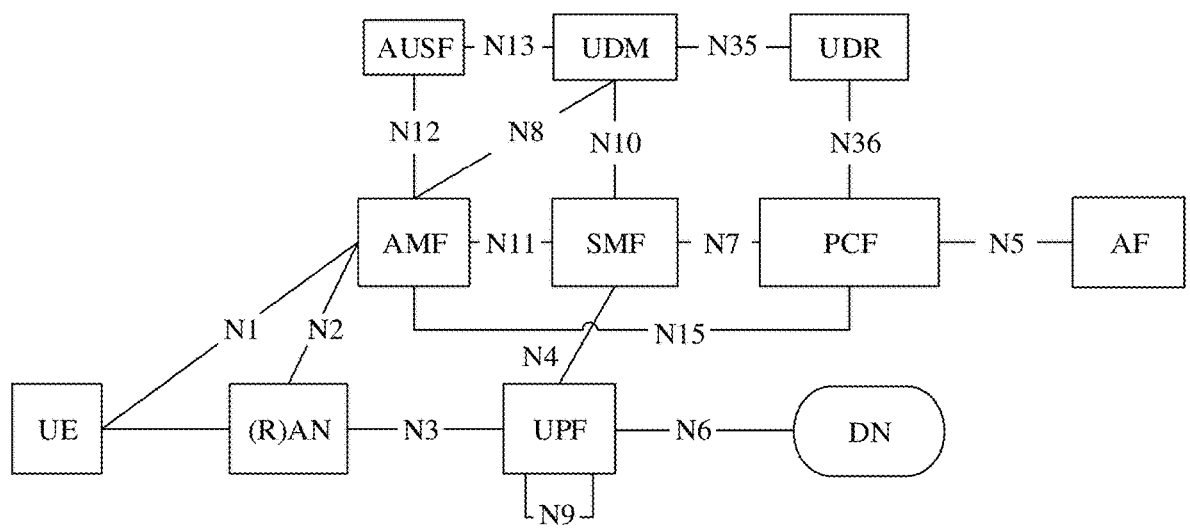
FIG. 1B is a schematic diagram of a 5G network architecture based on a point-to-point interface.

FIG. 1B is a schematic diagram of a 5G network architecture based on a point-to-point interface. For descriptions of functions of network elements in FIG. 1B, refer to descriptions of functions of corresponding network elements in FIG. 1A. Details are not described again. A main difference between FIG. 1B and FIG. 1A lies in that interfaces between network elements in FIG. 1B are point-to-point interfaces rather than service-oriented interfaces.

In the architecture shown in FIG. 1B, names and functions of the interfaces between the network elements are as follows:

(1) N7 represents an interface between the PCF and the SMF, and is configured to deliver a protocol data unit (protocol data unit, PDU) session granularity control policy and a service data flow granularity control policy.

(2) N15 represents an interface between the PCF and the AMF, and is configured to deliver a UE policy and an access control related policy.

(3) N5 represents an interface between the AF and the PCF, and is configured to deliver an application service request and report a network event.

(4) N4 represents an interface between the SMF and the UPF, and is configured to transfer information between a control plane and a user plane, including delivery of forwarding rules, QoS control rules, traffic statistics rules, and the like from the control plane to the user plane, and reporting of user plane information.

(5) N11 represents an interface between the SMF and the AMF, and is configured to: transfer PDU session tunnel information between the RAN and the UPF, transfer a control message to be sent to the UE, transfer radio resource control information to be sent to the RAN, and the like.

(6) N2 represents an interface between the AMF and the RAN, and is configured to transfer radio bearer control information and the like from a core network side to the RAN.

(7) N1 represents an interface between the AMF and the UE, and is configured to transfer the QoS control rules and the like to the UE.

(8) N8 represents an interface between the AMF and the UDM, and is used by the AMF to obtain, from the UDM, subscription data and authentication data related to access and mobility management, and used by the AMF to register current mobility management related information of the UE with the UDM.

(9) N10 represents an interface between the SMF and the UDM, and is used by the SMF to obtain, from the UDM, subscription data related to session management, and used by the SMF to register current session related information of the UE with the UDM.

(10) N35 represents an interface between the UDM and the UDR, and is used by the UDM to obtain user subscription data information from the UDR.

(11) N36 represents an interface between the PCF and the UDR, and is used by the PCF to obtain policy related subscription data and application data related information from the UDR.

(12) N12 represents an interface between the AMF and the AUSF, and is used by the AMF to initiate an authentication procedure to the AUSF, where an SUCI is carried as a subscription identifier.

(13) N13 represents an interface between the UDM and the AUSF, and is used by the AUSF to obtain a user authentication vector from the UDM, to perform an authentication procedure.

The network elements or the functions are network elements in a hardware device, software functions running on dedicated hardware, or virtualized functions instantiated on a platform (for example, a cloud platform). Optionally, the foregoing network elements or the functions are implemented by one device, is jointly implemented by a plurality of devices, or is one function module in one device. This is not limited in embodiments of this application.

The mobility management network element, the session management network element, the policy control network element, the application function network element, the access network device, the network exposure function network element, and the user plane network element in this application is respectively the AMF, the SMF, the PCF, the AF, the RAN, the NEF, and the UPF in FIG. 1A or FIG. 1B, or are network elements having functions of the AMF, the SMF, the PCF, the AF, the RAN, the NEF, and the UPF in future communication such as a 6th generation (6th generation, 6G) network. This is not limited in this application. For ease of description, for example, the mobility management network element, the session management network element, the policy control network element, the application function network element, the access network device, the network exposure function network element, and the user plane network element are respectively the AMF, the SMF, the PCF, the AF, the RAN, the NEF, and the UPF. Further, the terminal device is referred to as UE for short in this application.

A wireless audio system is a system using a radio wave instead of a cable to transmit an audio signal. The wireless audio system generally includes a wireless microphone system and a wireless echo system, and further includes a system that performs long-distance audio transmission in a wireless manner in some scenarios. The wireless audio system has become an indispensable subsystem in a current large-scale performance.

The wireless audio system is applied to scenarios such as a large-scale music concert and a vocal concert. The wireless audio system has a high threshold on an end-to-end latency (latency), a transmission periodicity, security and reliability, and sound quality.

Figure 2:
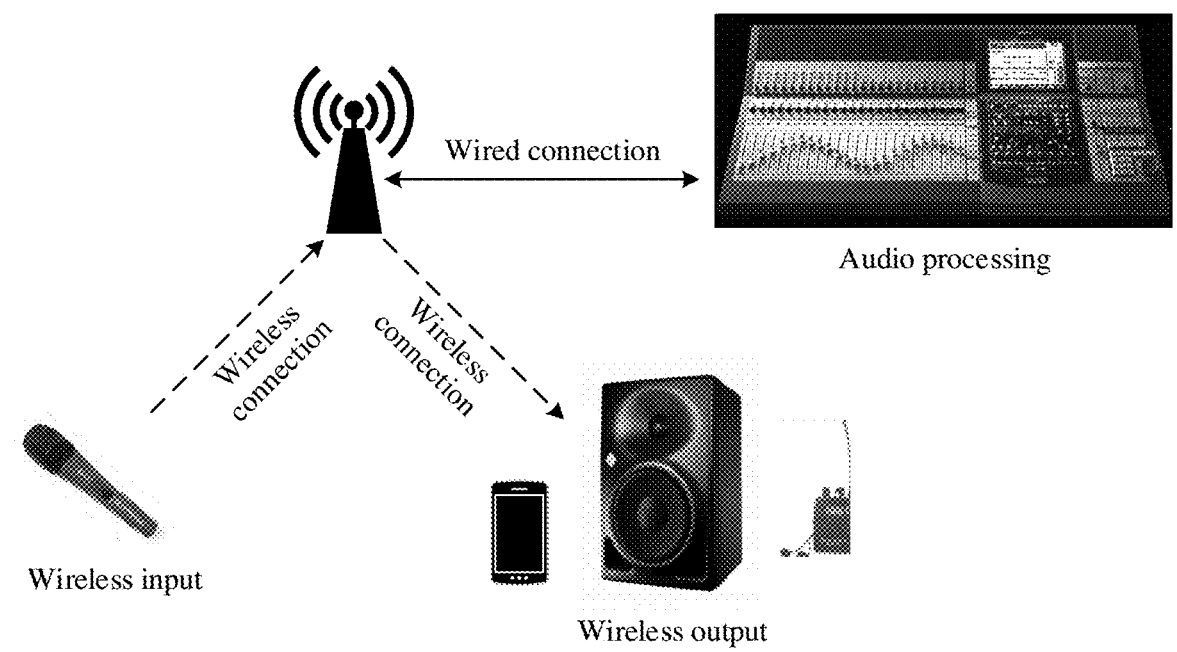
FIG. 2 is a schematic diagram of components in a professional audio production communication system.

FIG. 2 is a schematic diagram of components in a professional audio production communication system. In one aspect, the system includes a wireless audio input, denoted herein as a microphone. Audio is captured at an audio source and sent to an audio mixing server by using a wireless connection. The server performs mixing, transcoding, equalization, or another processing task on several types of audio inputs. A result of the audio processing is sent to an output device by using the wireless connection. The output device is a speaker, a general-purpose device equipped with a headset, or another device.

For example, in an actual performance process, a plurality of input devices usually generate sound source data. For example, in a music concert performance activity, there are a bass player, a guitarist, a drummer, and a lead singer. An input device of each of the bass player, the guitarist, the drummer, and the lead singer generates sound source data indispensable for the entire performance, and the sound source data is sent to a network side by using an access network device for audio combination or mixing.

When different UE sends uplink data, the access network device performs scheduling independently, and allocates different air interface scheduling resources to the different UE, so that the different UE sends uplink sound source data based on the allocated air interface scheduling resources. The audio mixing server performs audio mixing on the received different sound source data, and then sends mixed audio with a mixing effect to an in-ear monitor device of each performer by using the access network device. In this way, each performer hears a live performance effect.

Figure 3:
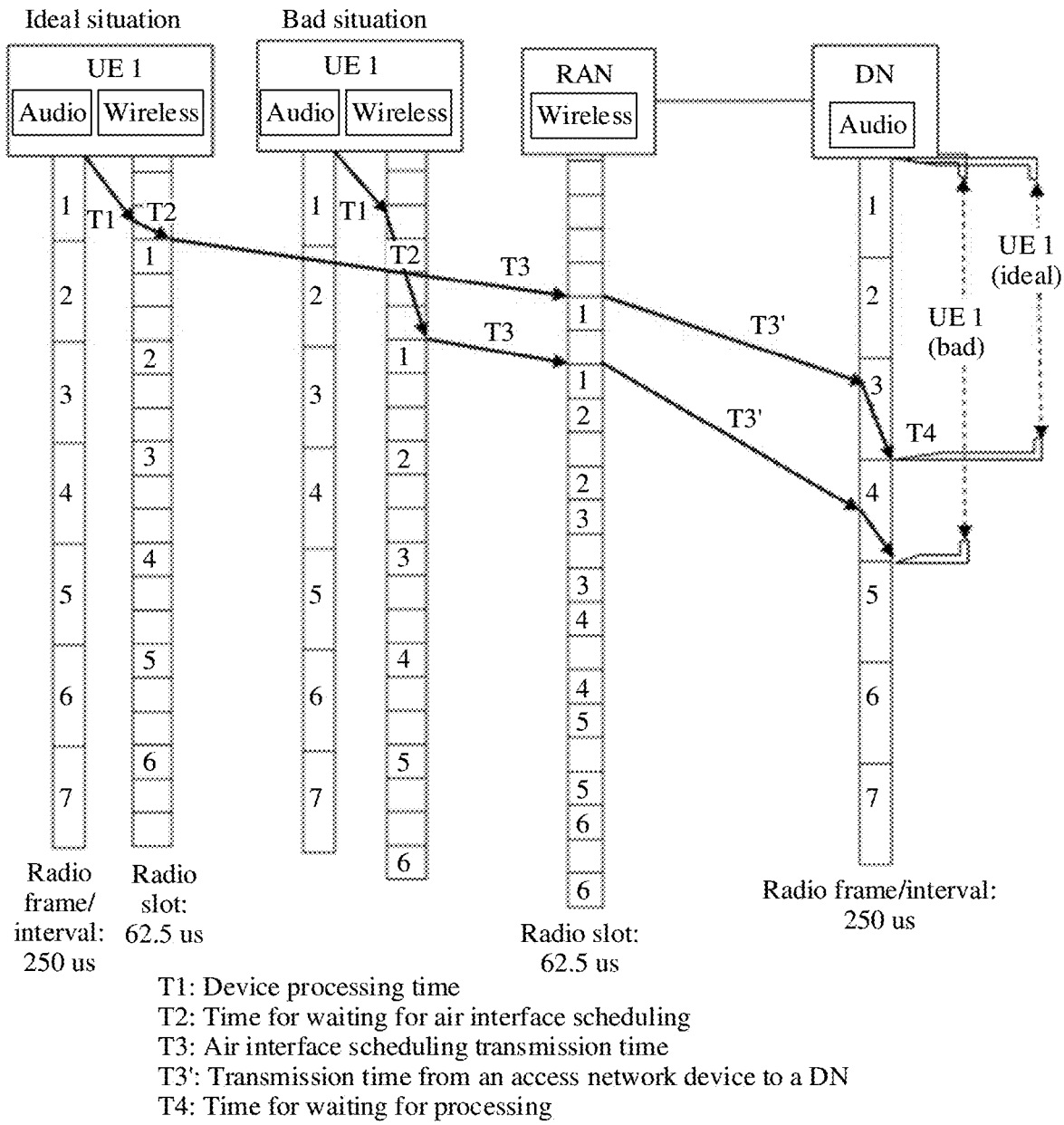
FIG. 3 is an example of an end-to-end latency.

FIG. 3 is an example of an end-to-end latency. In an ideal situation, T1, is the internal transmission time, (where T1 is a transmission latency of media frame data from an audio processor to a radio processor) for the audio processor inside UE to send the media frame data to the radio processor. Fortunately, the media frame data quickly catches up with a first air interface scheduling periodicity on an air interface side (that is, waiting time of T2 is short). Then, time T3 is taken to transmit the media frame data to the access network device, and takes time of T3' to send the media frame data to an audio mixing server on the network side. Because the audio mixing server on the DN side periodically samples data, the media frame data needs to wait for time of T4 before catching up with a next data sampling periodicity of the audio mixing server.

However, in a bad situation, T1 is taken, the internal transmission time, for the audio processor inside the UE to send the media frame data to the radio processor. Unfortunately, a previous air interface scheduling periodicity of the air interface side has just passed, and the media frame data needs to wait for a next air interface scheduling periodicity (that is, the waiting time of T2 is long). Then, time T3 is taken to transmit the media frame data to the access network device, and takes time of T3' to send the media frame data to an audio mixing server on the network side. Because the audio mixing server on the DN side periodically samples data, the media frame data needs to wait for time of T4 before catching up with a next data sampling periodicity of the audio mixing server.

The foregoing example shows that a total end-to-end latency is as follows: $T=T1+T2+T3+T3'+T4$. The following decomposes a latency on each path.

(1) T1 is the transmission latency of the media frame data from the audio processor inside the UE to the radio processor, and is generally a fixed value. T1 further is referred to as device processing time.

(2) A length of the waiting time of T2 depends on a scheduling status of an air interface resource of the access network device, but further depends on the time for the audio processor of the UE to send the media frame data to the radio processor.

(3) T3 is air interface receiving time from the UE to the access network device, and depends on other uncertain factors such as air interface congestion, air interface quality, and whether an air interface signal is blocked. T3 is generally a fixed value.

(4) T3' is a latency existing when the access network device sends the media frame data to the network side, and depends on a transmission latency of the network side. There are many factors that affect T3', for example, uncertain factors such as a network topology and network congestion. A scenario applicable to embodiments of this application is a deterministic transmission network. A latency from the access network device to the network side is a fixed value by default, that is, T3' is a fixed value.

(5) T4 depends on a data sampling periodicity of the audio mixing server on the DN side, but also depends on time when the media frame data arrives at the network side.

If the latency on the foregoing path is partially optimized, the total end-to-end latency is reduced. For example, if the audio processor senses first parameter information of an air interface scheduling resource, and adjust a periodicity length and a start moment of a scheduling resource for the audio processor to process the media frame data, in an optimal situation, T2 (that is, a latency of waiting for air interface scheduling) is reduced to 0 or close to 0. For another example, if the audio mixing server on the DN side senses the first parameter information of the air interface scheduling resource, and adjust the periodicity length and the start moment of the scheduling resource for the audio mixing server to process the media frame data, in an optimal situation, the media frame data immediately catches up with, when arriving at the network side, a periodicity of processing the media frame data by the audio mixing server, and T4 (that is, time for the media frame data to wait for a next data sampling periodicity of the audio mixing server) is reduced to 0 or close to 0.

Therefore, embodiments of this application mainly resolve a problem of how to optimize a latency in deterministic media transmission.

The audio processor in embodiments of this application includes but is not limited to at least one of the following submodule functions: an audio input, an audio output, audio encoding, and audio decoding. The audio processor further is referred to as an audio processing module, an audio signal processor, or an audio information processing module. The radio processor includes but is not limited to a radio frequency (Radio Frequency, RF) module. The radio processor further is referred to as a radio processing module, a radio signal processing module, or a radio signal processor.

Air interface scheduling in embodiments of this application includes but is not limited to semi-persistent scheduling (Semi-Persistent Scheduling, SPS). A RAN allocates periodic uplink and downlink resources to the UE for initial transmission of a service, and dynamically allocates a resource by using physical layer control signaling or media access control (Media Access Control, MAC) layer control signaling for data retransmission.

The air interface scheduling resource in embodiments of this application further is understood as an air interface transmission resource, or is understood as any one or more of the following meanings, a combination of some technical features in a plurality of meanings, or another similar meaning:

(1) The air interface scheduling resource is: When the UE has a threshold for transmitting uplink data, the RAN allocates the air interface transmission resource to the UE, so that the UE sends the uplink data by using the air interface transmission resource.

(2) The air interface scheduling resource is: The RAN notifies the UE of a plurality of transmission resources, so that when having a threshold for transmitting uplink data, the UE selects at least one transmission resource from the plurality of transmission resources allocated by the RAN, and sends the uplink data by using the selected transmission resource.

The air interface scheduling resource includes but is not limited to a combination of one or more of the following resources:

(1) a time domain resource, such as a radio frame, a subframe, or a symbol; a frequency domain resource, such as a subcarrier or a resource block; and a space domain resource, such as a transmit antenna or a beam;

(2) a code domain resource, such as a sparse code division multiple access (Sparse Code Multiple Access, SCMA) codebook, a low density signature (Low Density Signature, LDS) group, or a code division multiple access (Code Division Multiple Access, CDMA) code group; and (3) an uplink pilot resource.

The RAN transmits, on the air interface side based on the air interface scheduling resource, first uplink data from the UE. The transmission is performed based on control mechanisms including but not limited to the following:

(1) uplink power control, such as upper limit control of uplink transmit power; and modulation and coding scheme settings, such as a transmission block size setting, a code rate setting, and a modulation order setting; and (2) a retransmission mechanism, such as a hybrid automatic repeat request (Hybrid Automatic Repeat reQuest, HARQ) mechanism.

Figure 4:
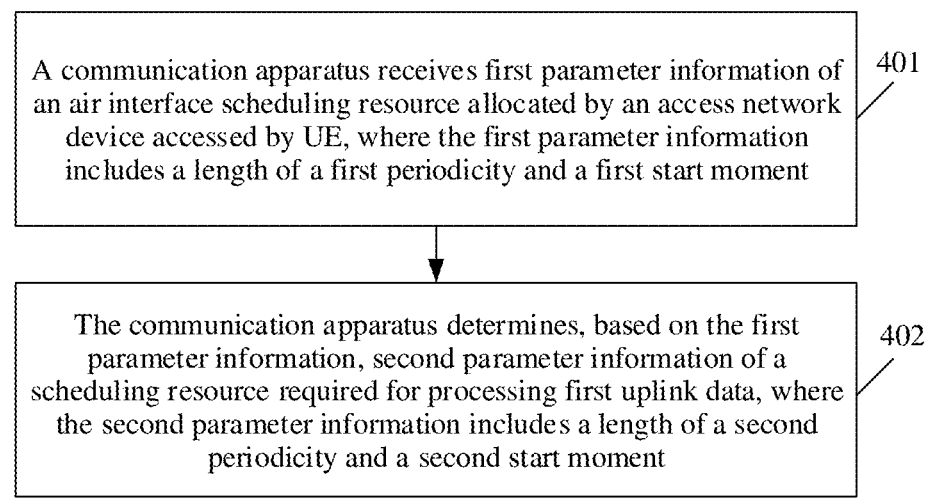
FIG. 4 is a schematic flowchart of a communication method according to an embodiment of this application.

To resolve the foregoing problem, based on the network architecture shown in FIG. 1A or FIG. 1B, as shown in FIG. 4, an embodiment of this application provides a communication method. The method is performed by a communication apparatus. The communication apparatus is a terminal device (for example, a chip or a circuit), or is an application server or a chip or a circuit in the application server.

The method includes the following steps.

Step 401. The communication apparatus receives first parameter information of an air interface scheduling resource allocated by an access network device accessed by UE, where the first parameter information includes a length of a first periodicity and a first start moment, and the first periodicity and the first start moment are respectively a periodicity and a start moment corresponding to transmitting first uplink data from the UE by the access network device on an air interface side.

The foregoing "transmitting uplink data from the UE by the RAN on an air interface side" further is understood as "receiving uplink data from the UE by the RAN on an air interface side". The uplink data from the UE is uplink data sent by a radio processor or a radio processing module of the UE.

Step 402. The communication apparatus determines, based on the first parameter information, second parameter information of a scheduling resource for processing the first uplink data, where the second parameter information includes a length of a second periodicity and a second start moment, and the second periodicity and the second start moment are respectively a periodicity and a start moment corresponding to processing the first uplink data by the communication apparatus.

Optionally, the communication apparatus adjusts a length of a third periodicity based on the length of the first periodicity, to obtain the length of the second periodicity, where the third periodicity is a periodicity corresponding to processing second uplink data by the communication apparatus before the adjustment; and/or the communication apparatus adjusts a third start moment based on the first start moment, to obtain the second start moment, where the third start moment is a start moment corresponding to processing the second uplink data by the communication apparatus before the adjustment.

The following describes an example in which the communication apparatus is a terminal device or an application server.

1. The communication apparatus is the terminal device.

In this case, the processing the uplink data means that the first uplink data is transmitted inside the terminal device after the terminal device obtains the first parameter information for the adjustment. That is, after the adjustment, uplink data transmitted from an audio processor inside the terminal device to a radio processor inside the terminal device is the first uplink data.

In this case, before the adjustment, the audio processor in the terminal device transmits, based on the length of the third periodicity and the third start moment, the sampled second uplink data from the audio processor to the radio processor. That is, before the adjustment, uplink data transmitted from the audio processor inside the terminal device to the radio processor inside the terminal device is the second uplink data. After the adjustment, the audio processor in the terminal device transmits, based on the length of the second periodicity and the second start moment, the sampled first uplink data from the audio processor to the radio processor. Alternatively, the terminal device adjusts a periodicity and/or a start moment for processing the uplink data from the third periodicity to the second periodicity, and/or adjusts the periodicity and/or the start moment from the third moment to the second moment.

After the terminal device transmits the first uplink data inside the UE from the audio processor to the radio processor based on the length of the second periodicity and/or the second start moment, duration for which the radio processor waits before sending the first uplink data to the RAN based on the obtained air interface scheduling resource is first duration. After the terminal device transmits the second uplink data inside the UE from the audio processor to the radio processor based on the length of the third periodicity and/or the third start moment, duration for which the radio processor waits before sending the second uplink data to the RAN based on the obtained air interface scheduling resource is second duration. The first duration is less than or equal to the second duration, and the first duration is zero or close to zero.

In conclusion, after obtaining the first parameter information, the audio processor of the UE adjusts a scheduling resource (including at least one of a periodicity length or a start moment of uplink data sampling) for the uplink data of the local audio processor, to eliminate or reduce a latency of waiting for air interface scheduling after the uplink data arrives at the radio processor, to achieve latency optimization. For example, the UE adjusts, based on the first parameter information of the air interface scheduling resource, the start moment of the uplink data sampling of the audio processor, so that first media frame data sampled by the audio processor just catches up with a start moment of a first air interface scheduling periodicity after internal transmission duration of T1 (where transmission time of the media frame data from the audio processor to the radio processor is T1). Optionally, the periodicity length of the uplink data sampling of the audio processor is adjusted to be equal to a periodicity length of the air interface scheduling resource, so that media frame data subsequently sampled catches up with a start moment of an air interface scheduling periodicity after the same duration of T1 (that is, time of T2 in FIG. 3 is reduced to 0, that is, the first duration is equal to 0).

In an implementation, before step 401, the terminal device sends first indication information to an AMF, where the first indication information is used to request the first parameter information of the air interface scheduling resource currently allocated by the access network device accessed by the UE. Therefore, in step 401, the terminal device receives the first parameter information from the AMF.

Optionally, the terminal device includes the first indication information in a first request, and send the first request to the AMF, where the first request includes the first indication information, and a request message is a registration request, a session establishment request, or a session modification request.

2. The communication apparatus is the application server.

In this case, before the adjustment, the application server processes the second uplink data from the UE based on the length of the third periodicity and the third start moment. That is, before the adjustment, uplink data that is from the UE and that is processed by the application server is referred to as the second uplink data. After the adjustment, the application server processes the first uplink data from the UE based on the length of the second periodicity and the second start moment. That is, after the adjustment, uplink data that is from the UE and that is processed by the application server is referred to as the first uplink data. Alternatively, the application server adjusts a periodicity and/or a start moment for processing the uplink data from the UE from the third periodicity to the second periodicity, and/or adjusts the periodicity and/or the start moment from the third moment to the second moment.

Duration for which the application server waits before processing the first uplink data from the UE based on the length of the second periodicity and/or the second start moment is third duration. Duration for which the application server waits before processing the second uplink data from the UE based on the length of the third periodicity and/or the third start moment is fourth duration. The third duration is less than or equal to the fourth duration, and the third duration is zero or close to zero.

In conclusion, after obtaining the first parameter information, the application server adjusts a scheduling resource (including at least one of a periodicity length or a start moment of uplink data sampling of the audio processor) for processing the uplink data from the UE by the local audio processor, to eliminate or reduce a latency of waiting for the uplink data sampling after the uplink data arrives at the audio processor, to achieve latency optimization. For example, the application server adjusts, based on the first parameter information of the air interface scheduling resource, a start moment of the uplink data sampling periodicity of the audio processor, so that first media frame data just catches up with a start moment of a first data sampling periodicity of the audio processor after arriving at the application server. Optionally, the periodicity length of the data sampling of the audio processor is adjusted to be equal to a sum of a periodicity length of the air interface scheduling resource and a latency (that is, T3') of sending the media frame data from the access network device to the application server, so that subsequent media frame data catches up with the start moment of the data sampling periodicity of the audio processor of the application server after arriving at the application server (that is, T4 in FIG. 3 is reduced to 0, that is, the third duration is equal to 0).

In an implementation, before step 401, the application server sends a second request to an AF, where the second request includes identification information of the UE, and the second request is used to request the first parameter information of the air interface scheduling resource currently allocated by the access network device accessed by the UE. Therefore, in step 401, the application server receives the first parameter information from the AF.

Optionally, that the second request is used to request the first parameter information of the air interface scheduling resource currently allocated by the access network device accessed by the UE includes: A second request message includes second indication information, and the second indication information is used to request the first parameter information of the air interface scheduling resource currently allocated by the access network device accessed by the UE.

Based on the foregoing solution, the communication apparatus receives the first parameter information of the air interface scheduling resource, and adjusts, based on the first parameter information, a periodicity and/or a start moment for locally processing the uplink data, so that an end-to-end latency is reduced, and a latency variation of a deterministic service is reduced, thereby improving user experience.

Figure 5:
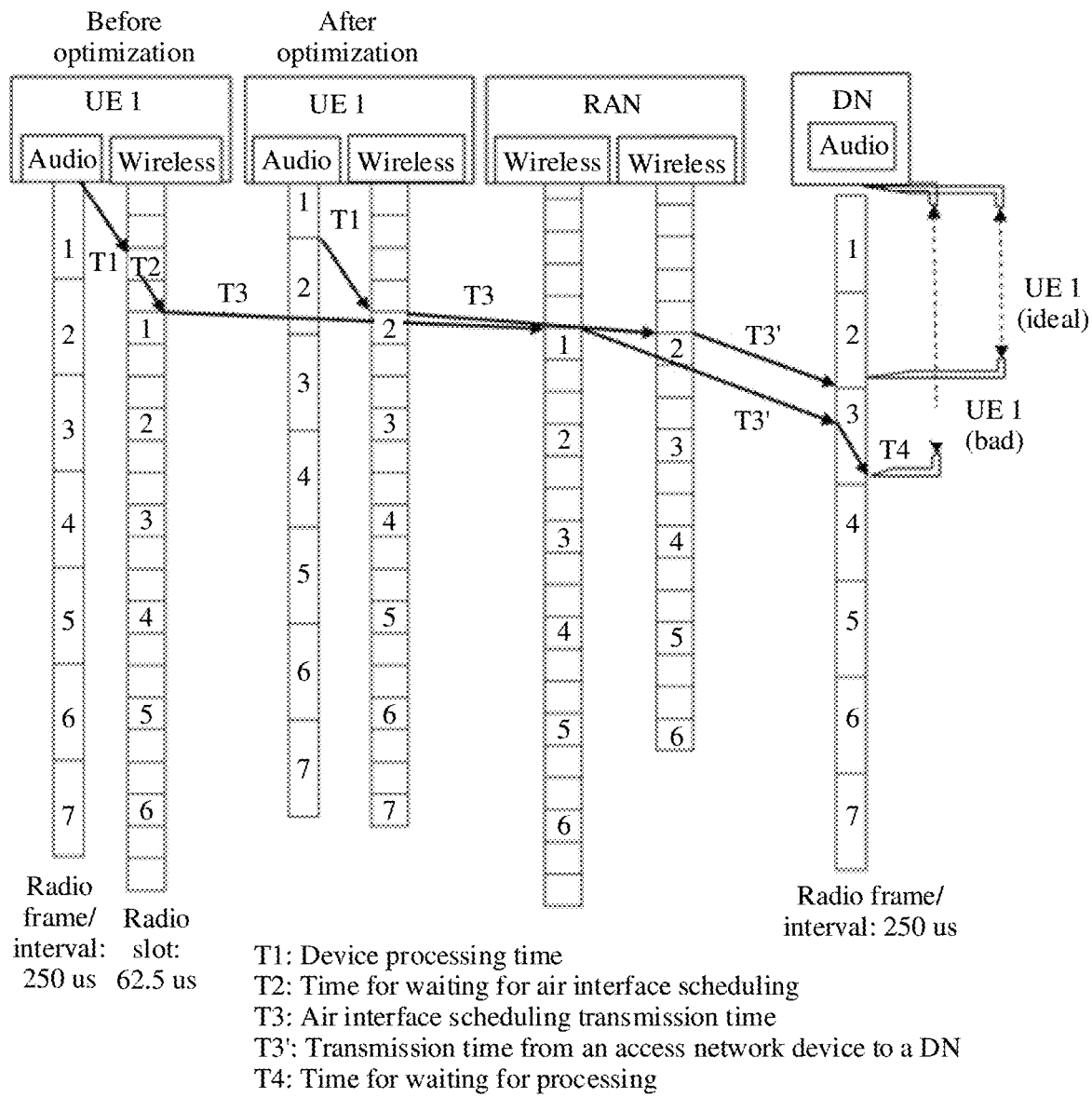
FIG. 5 is a schematic comparison diagram of end-to-end latencies before and after optimization.

FIG. 5 is a schematic comparison diagram of end-to-end latencies before and after optimization. For example, the application server is an audio mixing server.

Before the optimization, because an audio processor of UE is unable to obtain the first parameter information of the air interface scheduling resource, after arriving at the radio processor from the audio processor, media frame data needs to wait for unknown time (for example, T2 in the figure, and in this case, T2 is further referred to as second duration) before catching up with air interface scheduling. Then, time T3 is taken to transmit the media frame data to the access network device, and takes time of T3' to send the media frame data to the server. Because the server further has a data sampling periodicity, the media frame data needs to wait for time of T4 (in this case, T4 is further referred to as fourth duration) before catching up with a start moment of a next data sampling periodicity. Therefore, before the optimization, a total end-to-end latency of T is equal to T1+T2+T3+T3'+T4.

After the optimization, the audio processor of the UE and an audio processor of the audio mixing server on a DN side separately obtain the first parameter information of the air interface scheduling resource, and adjust a periodicity length and a start moment of the data sampling. On the UE side, after the media frame data arrives at the radio processor from the audio processor, a latency (that is, T2) of waiting for air interface scheduling is reduced to 0 (in this case, T2 is further referred to as first duration, and the first duration is equal to 0). After arriving at the audio mixing server on the network side, the media frame data immediately catches up with a start moment of a next data sampling periodicity of the audio mixing server, and time (that is, T4) that the media frame data waits for the data sampling of the audio mixing server further is reduced to 0 (in this case, T4 is further referred to as third duration, and the third duration is equal to 0). Therefore, after the optimization, a total end-to-end latency of T is equal to T1+T3+T3'.

In other words, T2 is reduced from the second duration before the optimization to the first duration after the optimization, and the first duration is equal to 0. Therefore, T2 is reduced to 0. T4 is reduced from the fourth duration before the optimization to the third duration after the optimization, and the third duration is equal to 0. Therefore, T4 is reduced to 0.

Optionally, after the optimization, the periodicity length of the data sampling of the UE side is equal to a periodicity length of the air interface scheduling resource, and the periodicity length of the data sampling of the audio mixing server side is equal to a sum of the periodicity length of the air interface scheduling resource and T3'.

The following describes the procedures shown in FIG. 4 with reference to examples.

Figure 6:
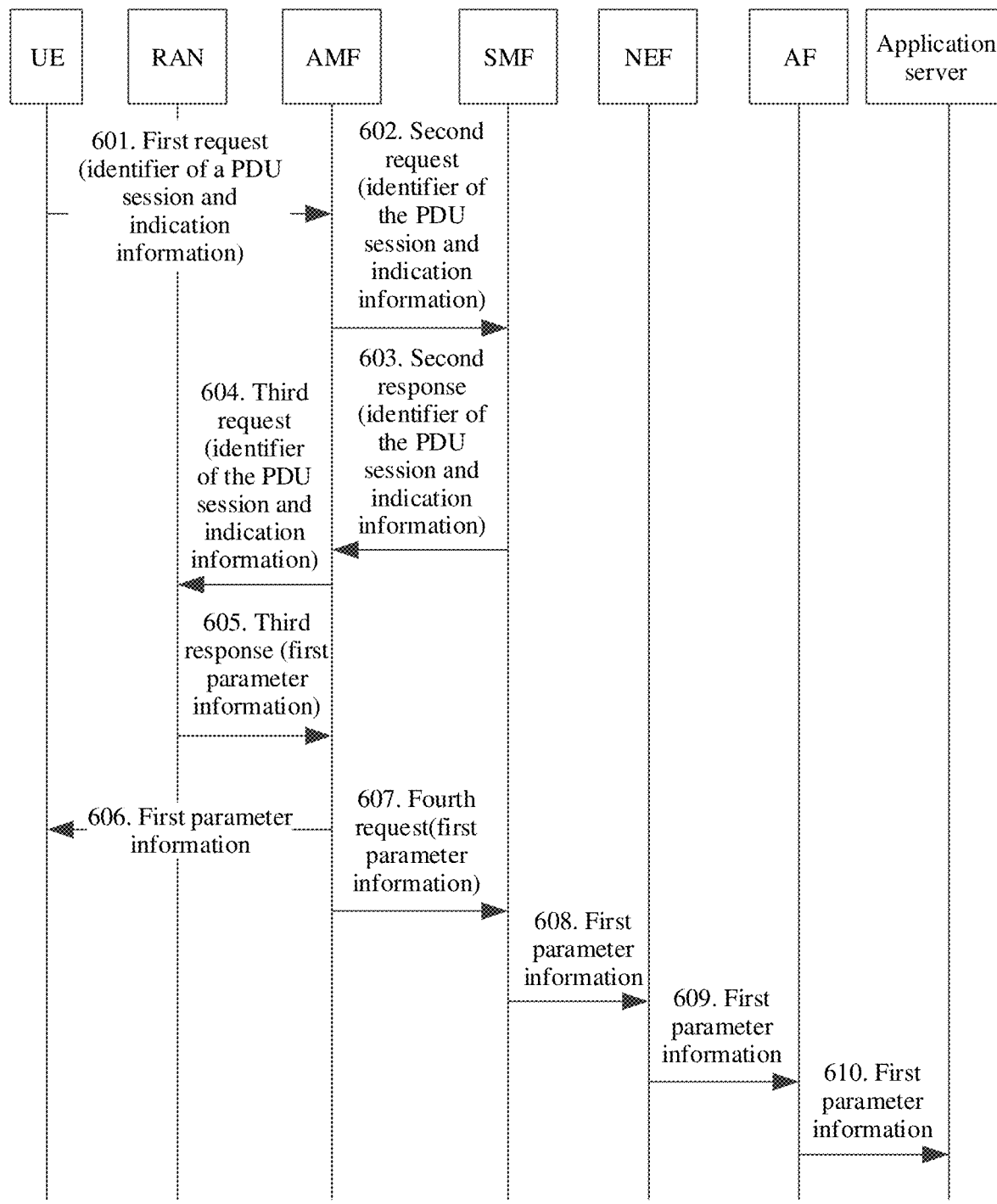
FIG. 6 is a schematic flowchart of another communication method according to an embodiment of this application.

FIG. 6 is a schematic flowchart of another communication method according to this application. On a UE side, this embodiment is performed by a communication apparatus such as a chip or a circuit inside the UE. The chip or the circuit includes an audio processor and a radio processor. On an application server side, this embodiment is performed by a communication apparatus such as a chip or a circuit inside the application server. The chip or the circuit includes an audio processor.

The method includes the following steps.

Step 601. The UE sends a first request to an AMF. Correspondingly, the AMF receives the first request.

The first request carries an identifier of a PDU session (PDU session ID) and indication information. The indication information is used to request first parameter information of an air interface scheduling resource currently allocated by a RAN accessed by the UE.

The first parameter information includes a length of a first periodicity and a first start moment, and the first periodicity and the first start moment are respectively a periodicity and a start moment corresponding to transmitting uplink data from the UE by the RAN on an air interface side based on the air interface scheduling resource.

The foregoing "transmitting uplink data from the UE by the RAN on an air interface side" further is understood as "receiving uplink data from the UE by the RAN on an air interface side". The uplink data from the UE is uplink data sent by a radio processor or a radio processing module of the UE.

Step 602. The AMF sends a second request to an SMF. Correspondingly, the SMF receives the second request.

The second request carries the identifier of the PDU session and the indication information.

Step 603. The SMF sends a second response to the AMF. Correspondingly, the AMF receives the second response.

The second response carries the indication information and the identifier of the PDU session. For example, the second response carries an N2 session management container (N2 SM container), and the N2 SM container carries the indication information and the identifier of the PDU session. The second response further carries an N1 session management container (N1 SM container), and the N1 SM container carries the identifier of the PDU session and a first response.

Optionally, in the process, the SMF and a PCF further updates a session management-related policy.

Step 604. The AMF sends a third request to the RAN. Correspondingly, the RAN receives the third request.

The third request includes the N2 SM container and the N1 SM container, and the N2 SM container includes the indication information and the identifier of the PDU session.

After receiving the third request, the RAN allocates an air interface scheduling resource to the PDU session of the UE. The air interface scheduling resource is the scheduling resource that is currently allocated by the RAN to the UE on the air interface side and that is used to send the uplink data.

In this step, after allocating the air interface scheduling resource to the PDU session of the UE, the RAN sends a resource scheduling grant (Grant) to the UE by using a radio resource control (Radio Resource Control, RRC) layer, to indicate the UE to send the uplink data in a time unit. After receiving the scheduling grant of the air interface scheduling resource, the UE performs local configuration, and the UE subsequently sends the uplink data to the RAN based on the air interface scheduling resource. The radio processor of the UE receives, from the RAN, the air interface scheduling resource included in an RRC layer message, that is, the radio processor of the UE receives the air interface scheduling resource from RRC.

An example in which air interface scheduling is semi-persistent scheduling is used for description as follows: The RAN sends, to the UE by using RRC signaling, a parameter used to configure the semi-persistent scheduling. For example, the RRC signaling includes a field of RadioResourceConfigDedicated: sps-Config, and an identifier, SPS-C-RNTI (16 bits), of the semi-persistent scheduling is included in sps-Config. In sps-Config, a start subframe of the semi-persistent scheduling is further configured, and a subframe group (that is, a length of N subframes) including the start subframe and subsequent N-1 continuous subframes is used as duration of the semi-persistent scheduling. The start subframe is indicated by using a subframe number. In addition, sps-Config further includes a semi-persistent scheduling periodicity, for example, 20 ms. Subsequently, the UE sends and receives the uplink data on a same time frequency resource at an interval of 20 ms based on configuration information of the semi-persistent scheduling.

In this step, the RAN further sends the N1 SM container to the UE. After receiving the N1 SM container, the UE obtains the first response and the identifier of the PDU session in the N1 SM container.

Step 605. The RAN sends a third response to the AMF. Correspondingly, the AMF receives the third response.

The third response includes the first parameter information of the air interface scheduling resource currently allocated by the RAN. The first parameter information includes the length of the first periodicity and the first start moment, and the first periodicity and the first start moment are respectively a periodicity and a start moment corresponding to transmitting the first uplink data from the UE by the RAN on the air interface side based on the air interface scheduling resource.

That is, the RAN sends, to the AMF based on the indication information, the first parameter information of the air interface scheduling resource corresponding to the PDU session.

The semi-persistent scheduling manner in step 604 is used as an example for description as follows: The length of the first periodicity is a periodicity length of the semi-persistent scheduling, and the first start moment is a start moment of a subframe corresponding to the semi-persistent scheduling. For example, if the periodicity of the semi-persistent scheduling is 20 ms, and the start subframe of the semi-persistent scheduling configured in sps-Config is a subframe 20, the length of the first periodicity is 20 ms, and the first start moment is a moment corresponding to the start subframe 20. In this embodiment of this application, a start moment of a subframe corresponding to a subframe number is known or a fixed value.

Step 606. The AMF sends the first parameter information of the air interface scheduling resource to the UE. Correspondingly, the UE receives the first parameter information of the air interface scheduling resource.

For example, the AMF sends a non-access stratum (non-access stratum, NAS) message to the UE, and the NAS message carries the first parameter information of the air interface scheduling resource.

In this step, the audio processor of the UE receives, from the AMF, the air interface scheduling resource included in the NAS layer message, that is, the audio processor of the UE receives the first parameter information of the air interface scheduling resource from the NAS message.

Before the audio processor of the UE receives the first parameter information, a scheduling resource for transmitting the uplink data (which is referred to as the second uplink data) inside the UE from the audio processor to the radio processor includes third parameter information, and the third parameter information includes a length of a third periodicity and a third start moment.

After step 606, the audio processor of the UE determines, based on the received first parameter information of the air interface scheduling resource, that is, the length of the first periodicity and the first start moment, second parameter information of the scheduling resource for transmitting the uplink data from the audio processor to the radio processor. The second parameter information includes a length of a second periodicity and a second start moment, and the second periodicity and the second start moment are respectively a periodicity and a start moment corresponding to transmitting the uplink data inside the UE from the audio processor to the radio processor. For differentiation, after the audio processor of the UE receives the first parameter information of the air interface scheduling resource, uplink data transmitted from the audio processor to the radio processor is referred to as the first uplink data.

That is, before adjustment, the UE transmits the sampled second uplink data from the audio processor to the radio processor based on the length of the third periodicity and the third start moment. After the adjustment, the UE transmits the sampled first uplink data from the audio processor to the radio processor based on the length of the second periodicity and the second start moment. Alternatively, the UE adjusts the periodicity and/or the start moment for processing the uplink data from the third periodicity to the second periodicity, and/or adjusts the periodicity and/or the start moment from a third moment to a second moment. After the UE transmits the first uplink data inside the UE from the audio processor to the radio processor based on the length of the second periodicity and/or the second start moment, duration for which the radio processor waits before sending the first uplink data to the RAN based on the air interface scheduling resource obtained in step 604 is first duration. After the UE transmits the second uplink data inside the UE from the audio processor to the radio processor based on the length of the third periodicity and/or the third start moment, duration for which the radio processor waits before sending the second uplink data to the RAN based on the air interface scheduling resource obtained in step 604 is second duration. The first duration is less than or equal to the second duration, and the first duration is zero or close to zero. For example, referring to FIG. 5, before optimization, T2 is equal to the second duration, and after the optimization, T2 is equal to the first duration. Therefore, T2 is reduced, and when the first duration is equal to 0, T2 is eliminated. In conclusion, after obtaining the first parameter information, the audio processor of the UE adjusts a scheduling resource (including at least one of a periodicity length or a start moment of uplink data sampling) for the uplink data of the local audio processor, to eliminate or reduce a latency of waiting for air interface scheduling after the uplink data arrives at the radio processor, to achieve latency optimization. For example, the UE adjusts, based on the first parameter information of the air interface scheduling resource, the start moment of the uplink data sampling of the audio processor, so that first media frame data sampled by the audio processor just catches up with a start moment of a first air interface scheduling periodicity after internal transmission duration of T1 (where transmission time of the media frame data from the audio processor to the radio processor is T1). Optionally, the periodicity length of the uplink data sampling of the audio processor is adjusted to be equal to a periodicity length of the air interface scheduling resource, so that media frame data subsequently sampled catches up with a start moment of an air interface scheduling periodicity after the same duration of T1 (that is, time of T2 in FIG. 3 is reduced to 0, that is, the first duration is equal to 0).

The semi-persistent scheduling manner in step 604 is used as an example for description as follows: If the length of the first periodicity is 20 ms, and the first start moment is a moment corresponding to the start subframe, the audio processor of the UE adjusts the length of the third periodicity to the length of the second periodicity, that is, 20 ms, and adjusts the third start moment to the second start moment, that is, a moment of −T1 corresponding to the start subframe 20.

If the length of the third periodicity is equal to the length of the second periodicity, the audio processor of the UE is unable to adjust the periodicity. Alternatively, if the third start moment is the same as the second start moment, the audio processor of the UE is unable to adjust the start moment.

Step 607. The AMF sends a fourth request to the SMF. Correspondingly, the SMF receives the fourth request.

The fourth request includes the first parameter information of the air interface scheduling resource.

Step 608. The SMF sends the first parameter information of the air interface scheduling resource to a NEF. Correspondingly, the NEF receives the first parameter information of the air interface scheduling resource. For example, the SMF sends the first parameter information of the air interface scheduling resource to the NEF by using Nnef_EventExposure_Notify.

Optionally, the SMF further sends identification information of an AF to the NEF, where the identification information of the AF is determined by the SMF based on a subscription request sent by the AF. For example, before step 608, the AF sends the subscription request to the SMF, where the subscription request includes the identification information of the AF, identification information of the UE, and a subscription event, and the subscription event is used to subscribe to an event from the SMF: When the SMF obtains the first parameter information of the air interface scheduling resource currently allocated by the RAN accessed by the UE, the SMF sends the first parameter information to an AF network element corresponding to an identifier of the AF.

The SMF alternatively determines the identification information of the AF in another manner. For example, the SMF alternatively determines, based on the identifier of the PDU session, the identification information of the AF corresponding to the PDU session, or the SMF alternatively determines the identification information of the AF based on a service type of the PDU session. This is not limited in this embodiment of this application.

Step 609. The NEF sends the first parameter information of the air interface scheduling resource to the AF. Correspondingly, the AF receives the first parameter information of the air interface scheduling resource. For example, the NEF sends the first parameter information of the air interface scheduling resource to the AF by using Naf_EventExposure_Notify.

Step 610. The AF sends the first parameter information of the air interface scheduling resource to the application server. Correspondingly, the application server receives the first parameter information of the air interface scheduling resource.

The application server herein is, for example, an audio mixing server or an audio processor module responsible for audio mixing and combination inside the audio mixing server.

Before the application server receives the first parameter information in step 610, a scheduling resource for the application server to process the first uplink data from the UE includes fifth parameter information. The fifth parameter information includes a length of a fifth periodicity and a fifth start moment, where the length of the fifth periodicity and the fifth start moment are respectively a periodicity length and a start moment that are used by the application server to process the first uplink data from the UE.

The foregoing processing is understood as that the application server performs further processing, for example, audio mixing, on the first uplink data from the UE.

After step 610, the application server determines, based on the received first parameter information of the air interface scheduling resource, that is, the length of the first periodicity and the first start moment, fourth parameter information of the scheduling resource for processing the first uplink data from the UE. The fourth parameter information includes a length of a fourth periodicity and a fourth start moment, and the fourth periodicity and the fourth start moment are respectively a periodicity and a start moment corresponding to processing the first uplink data from the UE.

That is, before adjustment, the application server processes the second uplink data from the UE based on the length of the fifth periodicity and the fifth start moment. After the adjustment, the application server processes the first uplink data from the UE based on the length of the fourth periodicity and the fourth start moment. Alternatively, the application server adjusts the periodicity and/or the start moment for processing the uplink data from the fifth periodicity to the fourth periodicity, and/or adjusts the periodicity and/or the start moment from the fifth moment to the fourth moment.

Duration for which the application server waits before processing the first uplink data from the UE based on the length of the fourth periodicity and/or the fourth start moment is third duration. Duration for which the application server waits before processing the second uplink data from the UE based on the length of the fifth periodicity and/or the fifth start moment is fourth duration. The third duration is less than or equal to the fourth duration, and the third duration is zero or close to zero. For example, referring to FIG. 5, before optimization, T4 is equal to the fourth duration, and after the optimization, T4 is equal to the third duration. Therefore, T4 is reduced, and when the third duration is equal to 0, T4 is eliminated.

In conclusion, after obtaining the first parameter information, the application server adjusts a scheduling resource (including at least one of a periodicity length or a start moment of uplink data sampling of the audio processor) for processing the uplink data from the UE by the local audio processor, to eliminate or reduce a latency of waiting for the uplink data sampling after the uplink data arrives at the audio processor, to achieve latency optimization. For example, the application server adjusts, based on the first parameter information of the air interface scheduling resource, a start moment of the uplink data sampling periodicity of the audio processor, so that first media frame data just catches up with a start moment of a first data sampling periodicity of the audio processor after arriving at the application server. Optionally, the periodicity length of the data sampling of the audio processor is adjusted to be equal to a sum of a periodicity length of the air interface scheduling resource and a latency (that is, T3') of sending the media frame data from the access network device to the application server, so that subsequent media frame data catches up with the start moment of the data sampling periodicity of the audio processor of the application server after arriving at the application server (that is, T4 in FIG. 3 is reduced to 0, that is, the third duration is equal to 0).

The semi-persistent scheduling manner in step 604 is used as an example for description as follows: If the length of the first periodicity is 20 ms, and the first start moment is a moment corresponding to the start subframe, the audio processor of the application server adjusts the length of the fifth periodicity to the length of the fourth periodicity, that is, 20 ms, and adjusts the fifth start moment to the fourth start moment, that is, a moment corresponding to the start subframe 20+T3+T3'.

If the length of the fifth periodicity is equal to the length of the fourth periodicity, the audio processor of the application server is unable to adjust the periodicity. Alternatively, if the fifth start moment is the same as the fourth start moment, the audio processor of the application server is unable to adjust the start moment.

Optionally, after step 610, the application server further adjusts, based on the received first parameter information of the air interface scheduling resource, a scheduling resource (including a periodicity length of downlink data sampling) for downlink data sent by the local audio processor to the UE, to eliminate or reduce a latency for an access network to wait for the downlink data to be scheduled on an air interface after the downlink data arrives at the access network, to achieve latency optimization. For example, the application server adjusts, based on the first parameter information of the air interface scheduling resource, the periodicity length of the downlink data sampling. A sum of the adjusted periodicity length of the downlink data sampling and a latency of sending the downlink data from the application server to the access network device is equal to the periodicity length of the air interface scheduling resource. Therefore, after arriving at the access network device, the subsequent media frame data catches up with an air interface scheduling periodicity of the access network device.

Based on the foregoing solution, the network side triggers, by receiving the request from the UE, the RAN side to collect the first parameter information of the air interface scheduling resource, and send the first parameter information of the air interface scheduling resource to the UE and/or the application server, so that the UE and/or the application server adjusts, based on the first parameter information, a periodicity and/or a start moment for locally processing the uplink data, so that an end-to-end latency is reduced, and a latency variation of a deterministic service is reduced, thereby improving user experience.

In an implementation solution, the foregoing embodiment is initiated when the UE registers with a network, the first request is a registration request (Registration Request), the second request is a PDU session update request (Nsmf_P-DUSession_UpdateSMContext request), the first response is a registration accept message (Registration Accept), the second response is a PDU session update request response (Nsmf_PDUSession_UpdateSMContext response), the third request is an N2 session request (N2 session request), the third response is an N2 session response (N2 session response), and the fourth request is a PDU session update request (Nsmf_PDUSession_UpdateSMContext request).

In an implementation solution, the foregoing embodiment is performed in a PDU session establishment procedure after the UE registers with the network. In the PDU session establishment procedure, the first request is a PDU session establishment request (PDU Session establishment Request), the second request is a PDU session establishment request (Nsmf_PDUSession_CreateSMContext request), the first response is a PDU session establishment accept message (PDU Session Establishment Accept), the second response is a PDU session establishment request response (Nsmf_PDUSession_CreateSMContext response), the third request is an N2 session request (N2 session request), the third response is an N2 session response (N2 session response), and the fourth request is a PDU session update request (Nsmf_PDUSession_UpdateSMContext request).

In an implementation solution, the foregoing embodiment is performed in a PDU session modification procedure after the UE registers with the network. In the PDU session modification procedure, the first request is a PDU session modification request (PDU Session modification Request), the second request is a PDU session update request (Nsmf_PDUSession_UpdateSMContext request), the first response is a PDU session modification request acknowledgment (PDU Session Modification ack), the second response is a PDU session update response (Nsmf_PDUSession_UpdateSMContext response), the third request is an N2 session request (N2 session request), the third response is an N2 session response (N2 session response), and the fourth request is a PDU session update request (Nsmf_PDUSession_UpdateSMContext request).

Figure 7:
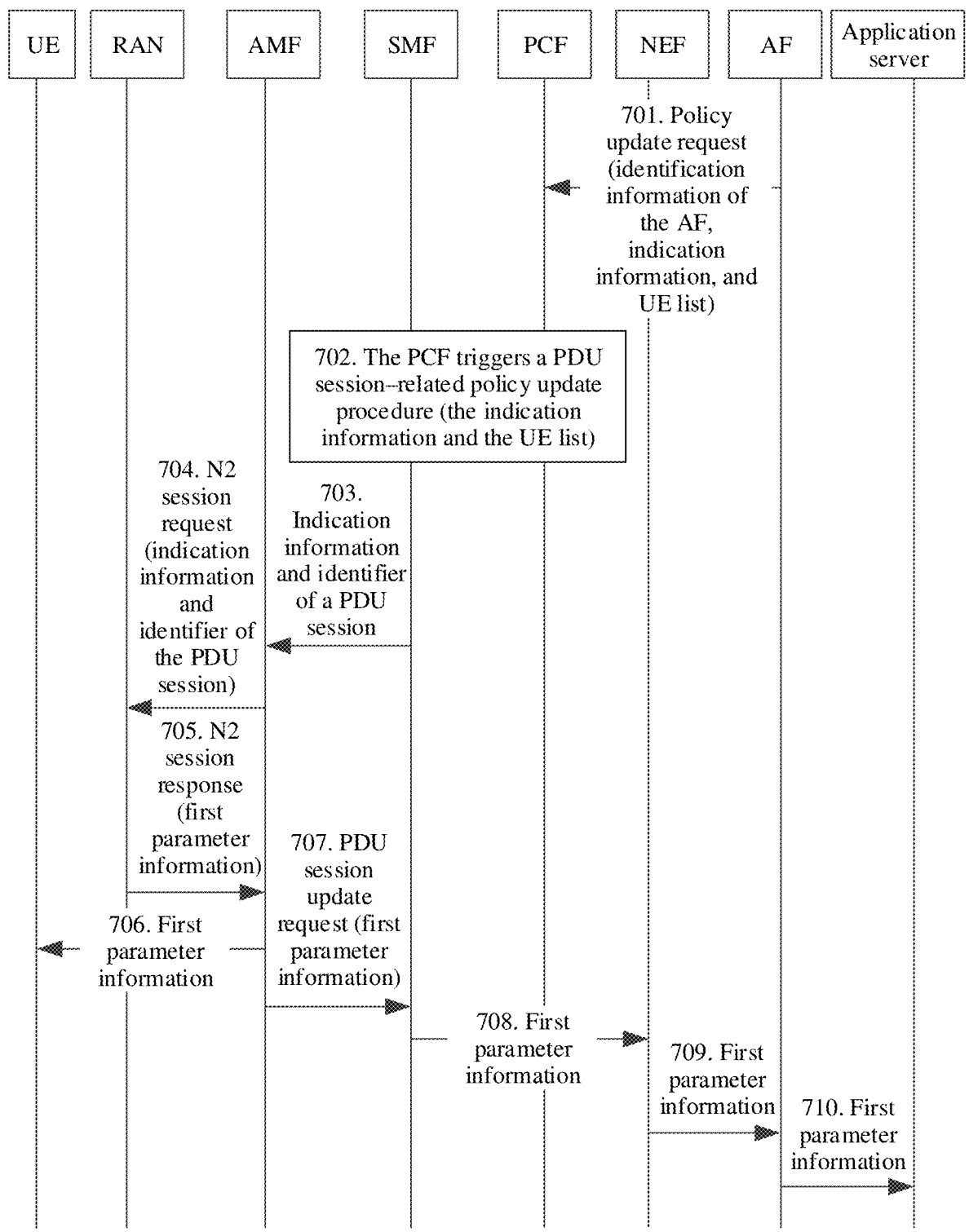
FIG. 7 is a schematic flowchart of another communication method according to an embodiment of this application.

FIG. 7 is a schematic flowchart of another communication method according to this application. On a UE side, this embodiment is performed by a communication apparatus such as a chip or a circuit inside the UE. The chip or the circuit includes an audio processor and a radio processor. On an application server side, this embodiment is performed by a communication apparatus such as a chip or a circuit inside the application server. The chip or the circuit includes an audio processor.

The method includes the following steps.

Step 701. An AF sends a policy update request (Npcf_PolicyAuthorization update request) to a PCF. Correspondingly, the PCF receives the policy update request.

For example, the AF sends the policy update request to the PCF by using a NEF.

The policy update request carries identification information of the AF, indication information, and a UE list (UE list).

The indication information is used to request first parameter information of an air interface scheduling resource currently allocated by a RAN accessed by each UE in the UE list. The UE list includes an identifier or identifiers of one or more UEs.

The first parameter information includes a length of a first periodicity and a first start moment, and the first periodicity and the first start moment are respectively a periodicity and a start moment corresponding to transmitting uplink data from the UE by the RAN on an air interface side based on the air interface scheduling resource.

The foregoing "transmitting uplink data from the UE by the RAN on an air interface side" further is understood as "receiving uplink data from the UE by the RAN on an air interface side". The uplink data from the UE is uplink data sent by a radio processor or a radio processing module of the UE, and the uplink data further is referred to as first uplink data.

Optionally, before step 701, the method further includes step 700: The AF receives a request message from the application server. The request message includes the indication information and the UE list (UE list), and the request message is used to request first parameter information of an air interface scheduling resource currently allocated by an access network device accessed by each UE in the UE list. The UE list includes an identifier or identifiers of one or more UEs.

Step 702. The PCF triggers a PDU session-related policy update procedure (PCF initiated SMF Policy Association Modification). In the procedure, the PCF triggers an SMF to update a PDU session of the UE indicated by the UE list, and the PCF sends the indication information and the UE list to the SMF.

Optionally, the PCF further sends the identification information of the AF to the SMF.

Step 703. The SMF sends the indication information and an identifier of the PDU session to an AMF.

The identifier of the PDU session herein is determined based on the identifier of the UE in the UE list. That is, the SMF determines, based on the identifier of each UE in the UE list, the PDU session established by the UE.

For example, the SMF sends the indication information and the identifier of the PDU session to the AMF by using Namf_Communication_N1N2MessageTransfer request.

Step 704. The AMF sends an N2 session request (N2 session request) to the RAN. Correspondingly, the RAN receives the N2 session request.

The N2 session request includes an N2 SM container and an N1 SM container. The N2 SM container includes the indication information and the identifier of the PDU session, and the N1 SM container carries the identifier of the PDU session and a PDU session modification acknowledgment (PDU Session Modification ack).

After receiving the N2 session request, the RAN allocates an air interface scheduling resource to the PDU session of the UE. The air interface scheduling resource is the scheduling resource that is currently allocated by the RAN to the UE on the air interface side and that is used to send the uplink data.

In this step, after allocating the air interface scheduling resource to the PDU session of the UE, the RAN sends a resource scheduling grant (Grant) to the UE by using RRC, to indicate the UE to send the uplink data in a time unit. After receiving the scheduling grant of the air interface scheduling resource, the UE performs local configuration, and the UE subsequently sends the uplink data to the RAN based on the air interface scheduling resource. It is understood that the radio processor of the UE receives, from the RAN, the air interface scheduling resource included in an RRC layer message, that is, the radio processor of the UE receives the air interface scheduling resource from RRC.

An example in which air interface scheduling is semi-persistent scheduling is used for description as follows: The RAN sends, to the UE by using RRC signaling, a parameter used to configure the semi-persistent scheduling. For example, the RRC signaling includes a field of RadioResourceConfigDedicated: sps-Config, and an identifier, SPS-C-RNTI (16 bits), of the semi-persistent scheduling is included in sps-Config. In sps-Config, a start subframe of the semi-persistent scheduling is further configured, and a subframe group (that is, a length of N subframes) including the start subframe and subsequent N-1 continuous subframes is used as duration of the semi-persistent scheduling. The start subframe is indicated by using a subframe number. In addition, sps-Config further includes a semi-persistent scheduling periodicity, for example, 20 ms. Subsequently, the UE sends and receives the uplink data on a same time frequency resource at an interval of 20 ms based on configuration information of the semi-persistent scheduling.

In this step, the RAN further sends the N1 SM container to the UE. After receiving the N1 SM container, the UE obtains the PDU session modification acknowledgment and the identifier of the PDU session in the N1 SM container.

Step 705. The RAN sends an N2 session response (N2 session response) to the AMF. Correspondingly, the AMF receives the N2 session response.

The N2 session response includes the first parameter information of the air interface scheduling resource currently allocated by the RAN. The first parameter information includes the length of the first periodicity and the first start moment, and the first periodicity and the first start moment are respectively a periodicity and a start moment corresponding to transmitting the first uplink data from the UE by the RAN on the air interface side based on the air interface scheduling resource.

That is, the RAN sends, to the AMF based on the indication information, the first parameter information of the air interface scheduling resource corresponding to the PDU session.

The semi-persistent scheduling manner in step 704 is used as an example for description as follows: The length of the first periodicity is a periodicity length of the semi-persistent scheduling, and the first start moment is a start moment of a subframe corresponding to the semi-persistent scheduling. For example, if the periodicity of the semi-persistent scheduling is 20 ms, and the start subframe of the semi-persistent scheduling configured in sps-Config is a subframe 20, the length of the first periodicity is 20 ms, and the first start moment is a moment corresponding to the start subframe 20. In this embodiment of this application, a start moment of a subframe corresponding to a subframe number is known or a fixed value.

Step 706. The AMF sends the first parameter information of the air interface scheduling resource to the UE. Correspondingly, the UE receives the first parameter information of the air interface scheduling resource.

For example, the AMF sends a NAS message to the UE, and the NAS message carries the first parameter information of the air interface scheduling resource.

In this step, the audio processor of the UE receives, from the AMF, the air interface scheduling resource included in the NAS layer message, that is, the audio processor of the UE receives the first parameter information of the air interface scheduling resource from the NAS message.

Before the audio processor of the UE receives the first parameter information, a scheduling resource for transmitting the uplink data (which is referred to as the second uplink data) inside the UE from the audio processor to the radio processor includes third parameter information, and the third parameter information includes a length of a third periodicity and a third start moment.

After step 706, the audio processor of the UE determines, based on the received first parameter information of the air interface scheduling resource, that is, the length of the first periodicity and the first start moment, second parameter information of the scheduling resource for transmitting the first uplink data from the audio processor to the radio processor. The second parameter information includes a length of a second periodicity and a second start moment, and the second periodicity and the second start moment are respectively a periodicity and a start moment corresponding to transmitting the first uplink data inside the UE from the audio processor to the radio processor.

That is, before adjustment, the UE transmits the sampled second uplink data from the audio processor to the radio processor based on the length of the third periodicity and the third start moment. After the adjustment, the UE transmits the sampled first uplink data from the audio processor to the radio processor based on the length of the second periodicity and the second start moment. Alternatively, the UE adjusts the periodicity and/or the start moment for processing the uplink data from the third periodicity to the second periodicity, and/or adjusts the periodicity and/or the start moment from a third moment to a second moment. After the UE transmits the first uplink data inside the UE from the audio processor to the radio processor based on the length of the second periodicity and/or the second start moment, duration for which the radio processor waits before sending the first uplink data to the RAN based on the air interface scheduling resource obtained in step 604 is first duration. After the UE transmits the second uplink data inside the UE from the audio processor to the radio processor based on the length of the third periodicity and/or the third start moment, duration for which the radio processor waits before sending the second uplink data to the RAN based on the air interface scheduling resource obtained in step 704 is second duration. The first duration is less than or equal to the second duration, and the first duration is zero or close to zero. For example, referring to FIG. 5, before optimization, T2 is equal to the second duration, and after the optimization, T2 is equal to the first duration. Therefore, T2 is reduced, and when the first duration is equal to 0, T2 is eliminated. In conclusion, after obtaining the first parameter information, the audio processor of the UE adjusts a scheduling resource (including at least one of a periodicity length or a start moment of uplink data sampling) for the uplink data of the local audio processor, to eliminate or reduce a latency of waiting for air interface scheduling after the uplink data arrives at the radio processor, to achieve latency optimization. For example, the UE adjusts, based on the first parameter information of the air interface scheduling resource, the start moment of the uplink data sampling of the audio processor, so that first media frame data sampled by the audio processor just catches up with a start moment of a first air interface scheduling periodicity after internal transmission duration of T1 (where transmission time of the media frame data from the audio processor to the radio processor is T1). Optionally, the periodicity length of the uplink data sampling of the audio processor is adjusted to be equal to a periodicity length of the air interface scheduling resource, so that media frame data subsequently sampled catches up with a start moment of an air interface scheduling periodicity after the same duration of T1 (that is, time of T2 in FIG. 3 is reduced to 0, that is, the first duration is equal to 0).

The semi-persistent scheduling manner in step 704 is used as an example for description as follows: If the length of the first periodicity is 20 ms, and the first start moment is a moment corresponding to the start subframe, the audio processor of the UE adjusts the length of the third periodicity to the length of the second periodicity, that is, 20 ms, and adjusts the third start moment to the second start moment, that is, a moment of −T1 corresponding to the start subframe 20.

If the length of the third periodicity is equal to the length of the second periodicity, the audio processor of the UE is unable to adjust the periodicity. Alternatively, if the third start moment is the same as the second start moment, the audio processor of the UE is unable to adjust the start moment.

Step 707. The AMF sends a PDU session update request (Nsmf_PDUSession_UpdateSMContext request) to the SMF. Correspondingly, the SMF receives the PDU session update request.

The PDU session update request includes the first parameter information of the air interface scheduling resource.

Step 708. The SMF sends the first parameter information of the air interface scheduling resource to the NEF. Correspondingly, the SMF receives the first parameter information of the air interface scheduling resource.

For example, the SMF sends the first parameter information of the air interface scheduling resource to the NEF by using Nnef_EventExposure_Notify.

In this step, the SMF further sends the identification information of the AF to the NEF, so that the NEF addresses the AF network element. Methods for determining an identifier of the AF include but are not limited to the following several types.

(1) If the SMF receives the identification information of the AF from the PCF in step 702, the SMF sends the identification information of the AF to the NEF by using step 708.

(2) If the SMF does not receive the identification information of the AF from the PCF in step 702, the identification information of the AF is determined by the SMF based on a subscription request sent by the AF. For example, before step 708, the AF sends the subscription request to the SMF, where the subscription request includes the identification information of the AF, identification information of the UE, and a subscription event, and the subscription event is used to subscribe to an event from the SMF: When the SMF obtains the first parameter information of the air interface scheduling resource currently allocated by the RAN accessed by the UE, the SMF sends the first parameter information to an AF network element corresponding to an identifier of the AF.

(3) The SMF determines, based on the identifier of the PDU session, the identification information of the AF corresponding to the PDU session, or the SMF alternatively determines the identification information of the AF based on a service type of the PDU session, or the like.

Step 709. The NEF sends the first parameter information of the air interface scheduling resource to the AF. Correspondingly, the AF receives the first parameter information of the air interface scheduling resource.

For example, the NEF sends the first parameter information of the air interface scheduling resource to the AF by using Naf_EventExposure_Notify.

Step 710. The AF sends the first parameter information of the air interface scheduling resource to the application server. Correspondingly, the application server receives the first parameter information of the air interface scheduling resource.

The application server herein is, for example, an audio mixing server or an audio processor module responsible for audio mixing and combination inside the audio mixing server.

Before the application server receives the first parameter information in step 710, a scheduling resource for the audio mixing server to process the first uplink data from the UE includes fifth parameter information. The fifth parameter information includes a length of a fifth periodicity and a fifth start moment, where the length of the fifth periodicity and the fifth start moment are respectively a periodicity length and a start moment that are used by the application server to process the first uplink data from the UE.

The foregoing processing is understood as that the application server performs further processing, for example, audio mixing, on the first uplink data from the UE.

After step 710, the application server determines, based on the received first parameter information of the air interface scheduling resource, that is, the length of the first periodicity and the first start moment, fourth parameter information of the scheduling resource for processing the first uplink data from the UE. The fourth parameter information includes a length of a fourth periodicity and a fourth start moment, and the fourth periodicity and the fourth start moment are respectively a periodicity and a start moment corresponding to processing the first uplink data from the UE.

That is, before adjustment, the application server processes the second uplink data from the UE based on the length of the fifth periodicity and the fifth start moment. After the adjustment, the application server processes the first uplink data from the UE based on the length of the fourth periodicity and the fourth start moment. Alternatively, the application server adjusts the periodicity and/or the start moment for processing the uplink data from the fifth periodicity to the fourth periodicity, and/or adjusts the periodicity and/or the start moment from the fifth moment to the fourth moment.

Duration for which the application server waits before processing the first uplink data from the UE based on the length of the fourth periodicity and/or the fourth start moment is third duration. Duration for which the application server waits before processing the second uplink data from the UE based on the length of the fifth periodicity and/or the fifth start moment is fourth duration. The third duration is less than or equal to the fourth duration, and the third duration is zero or close to zero. For example, referring to FIG. 5, before optimization, T4 is equal to the fourth duration, and after the optimization, T4 is equal to the third duration. Therefore, T4 is reduced, and when the third duration is equal to 0, T4 is eliminated.

In conclusion, after obtaining the first parameter information, the application server adjusts a scheduling resource (including at least one of a periodicity length or a start moment of uplink data sampling of the audio processor) for processing the uplink data from the UE by the local audio processor, to eliminate or reduce a latency of waiting for the uplink data sampling after the uplink data arrives at the audio processor, to achieve latency optimization. For example, the application server adjusts, based on the first parameter information of the air interface scheduling resource, a start moment of the uplink data sampling periodicity of the audio processor, so that first media frame data just catches up with a start moment of a first data sampling periodicity of the audio processor after arriving at the application server. Optionally, the periodicity length of the data sampling of the audio processor is adjusted to be equal to a sum of a periodicity length of the air interface scheduling resource and a latency (that is, T3') of sending the media frame data from the access network device to the application server, so that subsequent media frame data just catch up with the start moment of the data sampling periodicity of the audio processor of the application server after arriving at the application server (that is, T4 in FIG. 3 is reduced to 0, that is, the third duration is equal to 0).

The semi-persistent scheduling manner in step 704 is used as an example for description as follows: If the length of the first periodicity is 20 ms, and the first start moment is a moment corresponding to the start subframe, the audio processor of the application server adjusts the length of the fifth periodicity to the length of the fourth periodicity, that is, 20 ms, and adjusts the fifth start moment to the fourth start moment, that is, a moment corresponding to the start subframe 20+T3+T3'.

If the length of the fifth periodicity is equal to the length of the fourth periodicity, the audio processor of the application server is unable to adjust the periodicity. Alternatively, if the fifth start moment is the same as the fourth start moment, the audio processor of the application server is unable to adjust the start moment.

Optionally, after step 710, the application server further adjusts, based on the received first parameter information of the air interface scheduling resource, a scheduling resource (including a periodicity length of downlink data sampling) for downlink data sent by the local audio processor to the UE, to eliminate or reduce a latency for an access network to wait for the downlink data to be scheduled on an air interface after the downlink data arrives at the access network, to achieve latency optimization. For example, the application server adjusts, based on the first parameter information of the air interface scheduling resource, the periodicity length of the downlink data sampling. A sum of the adjusted periodicity length of the downlink data sampling and a latency of sending the downlink data from the application server to the access network device is equal to the periodicity length of the air interface scheduling resource. Therefore, after arriving at the access network device, the subsequent media frame data catches up with an air interface scheduling periodicity of the access network device.

Step 706 to step 710 are performed for one UE. If the UE list includes identifiers of a plurality of UEs, step 706 to step 710 are performed once for each UE.

Based on the foregoing solution, the network side triggers, by receiving the request from the AF, the RAN side to collect the first parameter information of the air interface scheduling resource, and send the first parameter information of the air interface scheduling resource to the UE and/or the application server, so that the UE and/or the application server adjusts, based on the first parameter information, a periodicity and/or a start moment for locally processing the uplink data, so that an end-to-end latency is reduced, and a latency variation of a deterministic service is reduced, thereby improving user experience.

The foregoing mainly describes the solutions provided in this application from a perspective of interaction between network elements. To implement the foregoing functions, each network element includes a corresponding hardware structure and/or software module for implementing each function. A person skilled in the art is aware that, in combination with the units and algorithm steps in the examples described in embodiments disclosed in this specification, the present disclosure is implemented by hardware or a combination of hardware and computer software. Whether a function is performed by hardware or hardware driven by computer software depends on particular applications and design constraints of the technical solutions. A person skilled in the art uses different methods to implement the described functions for each particular application, but that the implementation goes beyond the scope of the present disclosure is unrealistic.

In the foregoing method embodiments, corresponding steps and operations implemented by the terminal device alternatively is implemented by a component (for example, a chip or a circuit) disposed in the terminal device, and the steps and the operations implemented by the application server alternatively is implemented by a component (for example, a chip or a circuit) disposed in the application server.

An embodiment of this application further provides an apparatus configured to implement any one of the foregoing methods. For example, this embodiment provides an apparatus including units (or means) configured to implement steps performed by the terminal device in any one of the foregoing methods. For another example, another apparatus is further provided, and includes units (or means) configured to implement the steps performed by the application server in any one of the foregoing methods.

Figure 8:
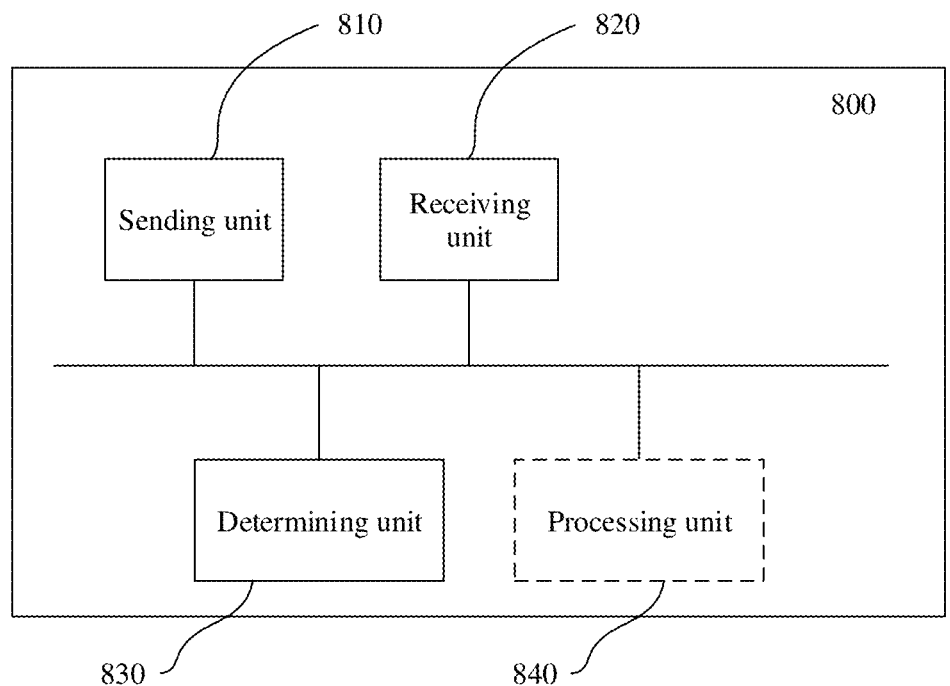
FIG. 8 is a schematic diagram of a communication apparatus according to an embodiment of this application.

FIG. 8 is a schematic diagram of a communication apparatus according to an embodiment of this application. The apparatus is configured to implement the steps performed by the corresponding communication apparatuses (such as the terminal device or the application server) in the foregoing method embodiments. As shown in FIG. 8, the apparatus 800 includes a sending unit 810, a receiving unit 820, and a determining unit 830. Optionally, the apparatus further includes a processing unit 840.

The receiving unit 820 is configured to receive first parameter information of an air interface scheduling resource allocated by an access network device accessed by a terminal device, where the first parameter information includes a length of a first periodicity and a first start moment, and the first periodicity and the first start moment are respectively a periodicity and a start moment corresponding to transmitting first uplink data from the terminal device by the access network device on an air interface side. The determining unit 830 is configured to determine, based on the first parameter information, second parameter information of a scheduling resource for processing the first uplink data, where the second parameter information includes a length of a second periodicity and a second start moment, and the second periodicity and the second start moment are respectively a periodicity and a start moment corresponding to processing the first uplink data by the communication apparatus.

In a possible implementation, the determining unit 830 is configured to: adjust a length of a third periodicity based on the length of the first periodicity, to obtain the length of the second periodicity, where the third periodicity is a periodicity corresponding to processing second uplink data by the communication apparatus before the adjustment; and/or adjust a third start moment based on the first start moment, to obtain the second start moment, where the third start moment is a start moment corresponding to processing the second uplink data by the communication apparatus before the adjustment.

In a possible implementation, the communication apparatus is a terminal device. The processing the uplink data includes: transmitting the first uplink data inside the terminal device. The sending unit 810 is configured to: after transmitting the first uplink data inside the terminal device based on the length of the second periodicity and/or the second start moment, wait for first duration, and send the first uplink data on the air interface scheduling resource. The first duration is less than or equal to second duration, and the second duration is duration for which the sending unit waits before sending the second uplink data on the air interface scheduling resource and after transmitting the second uplink data inside the terminal device based on the length of the third periodicity and/or the third start moment.

In a possible implementation, the communication apparatus is the terminal device. The sending unit 810 is configured to send first indication information to a mobility management network element, where the first indication information is used to request the first parameter information of the air interface scheduling resource currently allocated by the access network device accessed by the terminal device. The receiving unit 820 is configured to receive the first parameter information from the mobility management network element.

In a possible implementation, that the sending unit 810 is configured to send first indication information to a mobility management network element includes: sending a first request to the mobility management network element, where the first request includes the first indication information, and a request message is a registration request, a session establishment request, or a session modification request.

In a possible implementation, the communication apparatus is an application server. The processing unit 840 is configured to: after the first uplink data arrives at the application server, wait for third duration based on the length of the second periodicity and/or the second start moment, and process the first uplink data. The third duration is less than or equal to fourth duration, and the fourth duration is duration for which the application server waits before processing the second uplink data based on the length of the third periodicity and/or the third start moment after the second uplink data arrives at the application server.

In a possible implementation, the communication apparatus is the application server. The sending unit 810 is configured to send a second request to an application function network element, where the second request includes identification information of the terminal device, and the second request is used to request the first parameter information of the air interface scheduling resource currently allocated by the access network device accessed by the terminal device. That a receiving unit 820 is configured to receive first parameter information of an air interface scheduling resource allocated by an access network device accessed by a terminal device includes: receiving the first parameter information from the application function network element.

In a possible implementation, that the second request is used to request the first parameter information of the air interface scheduling resource currently allocated by the access network device accessed by the terminal device includes: A second request message includes second indication information, and the second indication information is used to request the first parameter information of the air interface scheduling resource currently allocated by the access network device accessed by the terminal device.

The foregoing units further is referred to as modules, circuits, or the like, and the foregoing units are independently disposed, or is completely or partially integrated.

In some possible implementations, the sending unit 810 and the receiving unit 820 alternatively is implemented by using a transceiver unit, or the sending unit 810 and the receiving unit 820 is collectively referred to as a transceiver unit and is implemented by using a communication interface. The determining unit 830 and the processing unit 840 is implemented by using a processor.

Optionally, the communication apparatus 800 further includes a storage unit. The storage unit is configured to store data or instructions (which further is referred to as code or a program). The foregoing units interacts with or be coupled to the storage unit, to implement a corresponding method or function. For example, the processing unit reads the data or the instructions in the storage unit, so that the communication apparatus implements the methods in the foregoing embodiments.

Division of the foregoing apparatus into units is division into logical functions. During actual implementation, all or some of the units are integrated into one physical entity, or is physically separated. In addition, the units in the apparatus is implemented in a form in which a processing element invokes software, or is implemented in a form of hardware; or some units are implemented in a form of software invoked by a processing element, and some units are implemented in a form of hardware. For example, the units are separately disposed processing elements, or is integrated into a chip of the apparatus for implementation. In addition, the units are stored in a memory in a program form, and is invoked by a processing element of the apparatus to perform functions of the units. In addition, all or some of the units are integrated, or is implemented independently. The processing element herein further is referred to as a processor, and is an integrated circuit having a signal processing capability. During implementation, steps in the foregoing methods or the foregoing units are implemented by using a hardware integrated logic circuit in the processor element, or is implemented in the form in which a processing element invokes software.

For example, the units in any one of the foregoing apparatuses are one or more integrated circuits configured to implement the foregoing methods, for example, one or more application-specific integrated circuits (Application-Specific Integrated Circuits, ASICs), one or more microprocessors (digital signal processors, DSPs), one or more field programmable gate arrays (Field Programmable Gate Arrays, FPGAs), or a combination of at least two of the integrated circuits. For another example, when the units in the apparatus is implemented in a form in which a processing element invokes a program, the processing element is a general-purpose processor, for example, a central processing unit (Central Processing Unit, CPU) or another processor that invokes the program. For another example, the units are integrated together and implemented in a form of a system-on-a-chip (system-on-a-chip, SOC).

The foregoing unit for receiving (for example, the receiving unit) is an interface circuit of the apparatus, and is configured to receive a signal from another apparatus. For example, when the apparatus is implemented by a chip, the receiving unit is an interface circuit that is of the chip and that is configured to receive a signal from another chip or apparatus. The foregoing unit for sending (for example, the sending unit) is an interface circuit of the apparatus, and is configured to send a signal to another apparatus. For example, when the apparatus is implemented by a chip, the sending unit is an interface circuit that is of the chip and that is configured to send a signal to another chip or apparatus.

Figure 9:
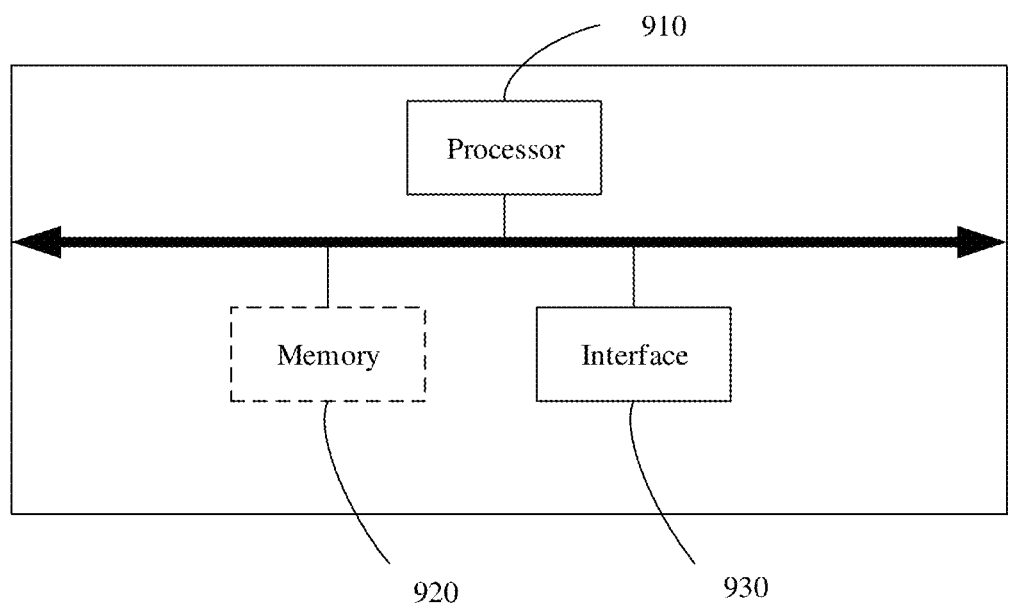
FIG. 9 is a schematic diagram of another communication apparatus according to an embodiment of this application.

FIG. 9 is a schematic structural diagram of a communication apparatus (for example, a terminal device or an application server) according to an embodiment of this application. The communication apparatus is configured to implement the operations of the communication apparatus in the foregoing embodiments. As shown in FIG. 9, the communication apparatus includes a processor 910 and an interface 930, and optionally, further includes a memory 920. The interface 930 is configured to communicate with another device.

The methods performed by the communication apparatus in the foregoing embodiments are implemented by the processor 910 by invoking a program stored in a memory (which is the memory 920 in the communication apparatus, or is an external memory). An apparatus used in the communication apparatus includes the processor 910. The processor 910 invokes the program in the memory, to perform the methods performed by the communication apparatus in the foregoing method embodiments. The processor herein is an integrated circuit having a signal processing capability, for example, a CPU. The apparatus used in the communication apparatus is implemented by one or more integrated circuits configured to implement the foregoing methods, for example, one or more ASICs, one or more microprocessors DSPs, one or more FPGAs, or a combination of at least two of these types of integrated circuits. Alternatively, the foregoing implementations are combined.

All or some of the foregoing embodiments are implemented by using software, hardware, firmware, or any combination thereof. When the software is used to implement embodiments, all or some of embodiments are implemented in a form of a computer program product. The computer program product includes one or more computer instructions. When the computer program instructions are loaded and executed on a computer, all or some of procedures or functions according to embodiments of this application are generated. The computer is a general-purpose computer, a dedicated computer, a computer network, or another programmable apparatus. The computer instructions are stored in a computer-readable storage medium or is transmitted from a computer-readable storage medium to another computer-readable storage medium. For example, the computer instructions are transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium is any usable medium accessible by a computer, or a data storage device, such as a server or a data center, integrating one or more usable media. The usable medium is a magnetic medium (for example, a floppy disk, a hard disk, or a magnetic tape), an optical medium (for example, a DVD), a semiconductor medium (for example, a solid-state drive (solid-state drive, SSD), or the like.

The various illustrative logical units and circuits described in embodiments of this application implements or operates the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor is a microprocessor. Optionally, the general-purpose processor further is any conventional processor, controller, microcontroller, or state machine. The processor further is implemented by a combination of computing apparatuses, such as a digital signal processor and a microprocessor, a plurality of microprocessors, one or more microprocessors with a digital signal processor core, or any other similar configuration.

In one or more exemplary designs, the functions described in this application is implemented by using hardware, software, firmware, or any combination thereof. If the functions are implemented by using the software, these functions are stored in a computer-readable medium or are transmitted to the computer-readable medium in a form of one or more instructions or code. The computer-readable medium includes a computer storage medium and a communication medium that enables a computer program to move from one place to another. The storage medium is an available medium that is accessed by any general-purpose or special computer. For example, such a computer-readable medium includes but is not limited to a RAM, a ROM, an EEPROM, a CD-ROM or another optical disc storage, a disk storage or another magnetic storage apparatus, or any other medium that is used to bear or store program code, where the program code is in a form of an instruction structure or a data structure or in a form that is read by a general-purpose or special computer or a general-purpose or special processor. In addition, any connection is appropriately described as the computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in the described computer-readable medium. The disk (disk) and the disc (disc) include a compact disc, a laser disc, an optical disc, a digital versatile disc (English: Digital Versatile Disc, DVD for short), a floppy disk, and a Blu-ray disc. The disc usually copies data by a magnetic means, and the disk optically copies data by a laser means. The foregoing combination further is included in the computer-readable medium.

A person of ordinary skill in the art understands that various numerals such as "first" and "second" in this application are used for differentiation for ease of description, and are not used to limit the scope of embodiments of this application or represent a sequence. "And/or" describes an association relationship for describing associated objects and represents that three relationships exists. For example, A and/or B represents the following three cases: A exists, both A and B exist, and B exists. A character "/" generally indicates an "or" relationship between the associated objects. "At least one" means one or more. At least two means two or more. "At least one", "any one", or a similar expression means any combination of these items, including a single item (piece) or any combination of a plurality of items (pieces). For example, at least one (piece, or type) of a, b, or c represents a, b, c, a and b, a and c, b and c, or a, b and c, where a, b, and c is singular or plural. "A plurality of" means two or more than two, and another quantifier is similar to this.

A person skilled in the art is aware that in the foregoing one or more examples, functions described in this application is implemented by using hardware, software, firmware, or any combination thereof. When the functions are implemented by using the software, the foregoing functions are stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium is any available medium accessible to a general-purpose or dedicated computer.

The objectives, technical solutions, and benefits of this application are further described in detail in the foregoing embodiments. The foregoing descriptions are embodiments of this application, but are not intended to limit the protection scope of this application. Any modification, equivalent replacement, or improvement made based on the technical solutions of this application shall fall within the protection scope of this application. According to the foregoing descriptions of this specification in this application, any content of technologies in the art that is used or is used to implement this application and any modification based on disclosed content shall be considered obvious in the art. The basic principles described in this application is applied to other variations without departing from the essence and scope of this application. Therefore, the content disclosed in this application is not limited to the described embodiments and designs but further is extended to a maximum scope that is consistent with the principles and disclosed new features of this application.

Although this application is described with reference to features and embodiments thereof, various modifications and combinations are made to them without departing from the spirit and scope of this application. Correspondingly, the specification and accompanying drawings are example descriptions of this application described by the appended claims, and is considered as any of or all modifications, variations, combinations or equivalents that cover the scope of this application. A person skilled in the art makes various modifications and variations to this application without departing from the scope of this application. This application is intended to cover these modifications and variations of this application provided the modifications and variations fall within the scope of protection described by the following claims and equivalent technologies.

What is claimed is:

1. A communication method, comprising:
   receiving, by a communication apparatus, first parameter information of an air interface scheduling resource allocated by an access network device accessed by a terminal device, wherein the first parameter information includes:
   a length of a first periodicity and a first start moment corresponding to transmitting first uplink data from the terminal device to the access network device on an air interface side; and
   determining, by the communication apparatus based on the first parameter information, second parameter information of a scheduling resource for processing the first uplink data, wherein the second parameter information includes:
   a length of a second periodicity and a second start moment corresponding to processing the first uplink data by the communication apparatus, wherein
   the determining, by the communication apparatus based on the first parameter information, the second parameter information of the scheduling resource for processing the first uplink data comprises:
   adjusting, by the communication apparatus, a length of a third periodicity based on the length of the first periodicity, to obtain the length of the second periodicity, wherein the third periodicity is a periodicity corresponding to processing second uplink data by the communication apparatus before the adjustment; or
   adjusting, by the communication apparatus, a third start moment based on the first start moment, to obtain the second start moment, wherein the third start moment is a start moment corresponding to processing the second uplink data by the communication apparatus before the adjustment, the communication apparatus comprises the terminal device;
the processing the first uplink data comprises:
transmitting the first uplink data inside the terminal device; and
the method further comprising:
after transmitting the first uplink data inside the terminal device based on the length of the second periodicity or the second start moment, waiting, by the terminal device, for a first duration; and
sending, after waiting for the first direction, the first uplink data from the terminal device to the network device on the air interface scheduling resource, wherein:
the first duration is less than or equal to a second duration for which the terminal device waits before sending the second uplink data on the air interface scheduling resource; and
transmitting the second uplink data inside the terminal device based on the length of the third periodicity or the third start moment.

2. The method according to claim 1, wherein:
the method further comprising:
sending, by the terminal device, a first indication information to a mobility management network element, wherein:
the first indication information is used to request the first parameter information of the air interface scheduling resource allocated for accessing the network device by the terminal device; and
the receiving, by the communication apparatus, the first parameter information of the air interface scheduling resource comprises:
receiving, by the terminal device, the first parameter information from the mobility management network element.

3. The method according to claim 1, wherein: the communication apparatus further comprises an application server; and the method further comprising: after the first uplink data arrives at the application server, waiting, by the application server, for third duration based on the length of the second periodicity or the second start moment; and processing the first uplink data, wherein: the third duration is less than or equal to fourth duration for which the application server waits before processing the second uplink data based on the length of the third periodicity or the third start moment after the second uplink data arrives at the application server.

4. The method according to claim 1, wherein:
the communication apparatus further comprises an application server;
the method further comprising:
sending, by the application server, a second request to an application function network element, wherein the second request includes:
identification information of the terminal device; and
the second request is used to request the first parameter information of the air interface scheduling resource allocated by the access network device accessed by the terminal device; and
the receiving, by the communication apparatus, the first parameter information of the air interface scheduling resource allocated by the access network device accessed by the terminal device comprises:
receiving, by the application server, the first parameter information from the application function network element.

5. The method according to claim 4, wherein the second request is configured to request the first parameter information of the air interface scheduling resource allocated by the access network device accessed by the terminal device wherein:
the second request includes second indication information, configured to request the first parameter information of the air interface scheduling resource allocated by the access network device accessed by the terminal device.

6. A communication apparatus, comprising:
a processor coupled to a memory storing instructions and configured to execute the instructions to cause the processor to:
receive first parameter information of an air interface scheduling resource allocated by an access network device accessed by a terminal device, wherein:
the first parameter information includes a length of a first periodicity and a first start moment corresponding to transmitting first uplink data from the terminal device to the access network device on an air interface side; and
determine, based on the first parameter information, second parameter information of a scheduling resource for processing the first uplink data, wherein:
the second parameter information includes a length of a second periodicity and a second start moment corresponding to processing the first uplink data by the communication apparatus,
adjust a length of a third periodicity based on the length of the first periodicity, to obtain the length of the second periodicity, wherein the third periodicity is a periodicity corresponding to processing second uplink data by the communication apparatus before the adjustment; or
adjust a third start moment based on the first start moment, to obtain the second start moment, wherein the third start moment is a start moment corresponding to processing the second uplink data by the communication apparatus before the adjustment,
transmit the first uplink data inside the terminal device; and
after transmitting the first uplink data inside the terminal device based on the length of the second periodicity or the second start moment, wait for first duration; and
send, after waiting for the first duration, the first uplink data on the air interface scheduling resource, wherein:
the first duration is less than or equal to a second duration for which a sending unit waits before sending the second uplink data on the air interface scheduling resource and after transmitting the second uplink data inside the terminal device based on the length of the third periodicity or the third start moment.

7. The communication apparatus according to claim 6, wherein:
the processor further executes the instructions to:
send first indication information to a mobility management network element, wherein:
the first indication information is used to request the first parameter information of the air interface scheduling resource currently allocated for accessing the network device by the terminal device; and
receive the first parameter information from the mobility management network element.

8. The communication apparatus according to claim 6, wherein: the processor further executes the instructions to: after the first uplink data arrives at an application server, wait for third duration based on the length of the second periodicity or the second start moment: and process the first uplink data, wherein: the third duration is less than or equal to fourth duration for which the application server waits before processing the second uplink data based on the length of the third periodicity or the third start moment after the second uplink data arrives at the application server.

9. The communication apparatus according to claim 6, wherein: the processor further executes the instructions to: send a second request to an application function network element, wherein: the second request includes identification information of the terminal device, and the second request is used to request the first parameter information of the air interface scheduling resource allocated by the access network device accessed by the terminal device; and receive, from the application function network element, first parameter information of the air interface scheduling resource allocated by the access network device accessed by the terminal device.

10. The communication apparatus according to claim 9, wherein:
the second request is configured to request the first parameter information of the air interface scheduling resource currently allocated by the access network device accessed by the terminal device includes:
second indication information configured to request the first parameter information of the air interface scheduling resource allocated by the access network device accessed by the terminal device.

11. A communication system, comprising:
an access network device configured to send, to a core network element, first parameter information of an air interface scheduling resource allocated by the access network device accessed by a terminal device, wherein:
the first parameter information includes a length of a first periodicity and a first start moment corresponding to transmitting first uplink data from the terminal device to the access network device on an air interface side; and
the core network element is configured to send the first parameter information to a communication apparatus, wherein:
the first parameter information is used by the communication apparatus to determine, based on the first parameter information, second parameter information of a scheduling resource for processing the first uplink data, the second parameter information includes a length of a second periodicity and a second start moment corresponding to processing the first uplink data by the communication apparatus,
the communication apparatus comprises a terminal device;
the processing the first uplink data includes:
transmitting the first uplink data inside the terminal device; and
the length of the second periodicity or the second start moment is used by the terminal device to:
after transmitting the first uplink data inside the terminal device based on the length of the second periodicity or the second start moment, wait for first duration, and
send, after waiting for the first duration, the first uplink data on the air interface scheduling resource, wherein:
the first duration is less than or equal to a second duration for which the terminal device waits before sending second uplink data on the air interface scheduling resource and after transmitting the second uplink data inside the terminal device based on a length of a third periodicity or a third start moment, and
the third periodicity is a periodicity corresponding to processing the second uplink data by the terminal device before adjustment, and the third start moment is a start moment corresponding to processing the second uplink data by the terminal device before the adjustment.

12. The communication system according to claim 11, wherein:
the communication apparatus is the terminal device, and the core network element is a mobility management network element, configured to:
receive first indication information from the terminal device, wherein:
the first indication information is used to request the first parameter information of the air interface scheduling resource currently allocated for accessing the network device by the terminal device;
send the first indication information to a session management network element; and
receive the first parameter information from the session management network element.

13. The communication system according to claim 12, wherein:
the mobility management network element is configured to receive the first indication information from the terminal device that includes:
a first request from the terminal device, wherein the first request includes the first indication information, and a request message is a registration request, a session establishment request, or a session modification request.

14. The communication system according to claim 11, wherein:
the communication apparatus further comprises an application server;
the length of the second periodicity or the second start moment is used by the application server to:
after the first uplink data arrives at the application server, the application server waits for third duration based on the length of the second periodicity and/or the second start moment, and process the first uplink data, wherein:
the third duration is less than or equal to a fourth duration for which the application server waits before processing second uplink data based on a length of a third periodicity or a third start moment after the second uplink data arrives at the application server, the third periodicity is a periodicity corresponding to processing the second uplink data by the application server before adjustment, and the third start moment is a start moment corresponding to processing the second uplink data by the application server before the adjustment.

15. The communication system according to claim 14, wherein:
the core network element is an application function network element, configured to:
receive a second request from the application server, wherein:

the second request includes identification information of the terminal device, and the second request is used to request the first parameter information of the air interface scheduling resource currently allocated by the access network device accessed by the terminal device.

\* \* \* \* \*